(12) United States Patent
Sasa

(10) Patent No.: US 8,642,675 B2
(45) Date of Patent: Feb. 4, 2014

(54) ACTINIC RAY CURABLE COMPOSITION, ACTINIC RAY CURABLE INK-JET INK, IMAGE FORMING METHOD AND INK-JET RECORDING APPARATUS UTILIZING SAID ACTINIC RAY CURABLE INK-JET INK

(75) Inventor: Nobumasa Sasa, Sayama (JP)

(73) Assignee: Konica Minolta Medical & Graphic, Inc., Tokyo (JP)

(*) Notice: Subject to any disclaimer, the term of this patent is extended or adjusted under 35 U.S.C. 154(b) by 853 days.

(21) Appl. No.: 11/790,046

(22) Filed: Apr. 23, 2007

(65) Prior Publication Data

US 2007/0254977 A1    Nov. 1, 2007

(30) Foreign Application Priority Data

Apr. 27, 2006   (JP) .................. 2006-123269

(51) Int. Cl.
- *C08G 65/04* (2006.01)
- *B41J 2/01* (2006.01)
- *C09D 11/10* (2006.01)
- *B05D 1/26* (2006.01)

(52) U.S. Cl.
USPC .... 522/168; 106/31.6; 106/31.65; 106/31.89; 347/100; 347/103; 427/466

(58) Field of Classification Search
USPC ............. 522/77, 168, 109; 106/31.6, 31.65, 106/31.89; 427/466; 347/100, 103
See application file for complete search history.

(56) References Cited

U.S. PATENT DOCUMENTS

| | | | |
|---|---|---|---|
| 2005/0187309 A1* | 8/2005 | Watanabe | 522/75 |
| 2005/0190232 A1* | 9/2005 | Lee et al. | 347/45 |
| 2005/0287476 A1* | 12/2005 | Ishikawa et al. | 430/281.1 |
| 2006/0155005 A1* | 7/2006 | Kondo et al. | 523/160 |
| 2006/0189712 A1* | 8/2006 | Kondo | 523/160 |

FOREIGN PATENT DOCUMENTS

| | | |
|---|---|---|
| JP | 2003-147233 | 5/2003 |
| JP | 2004-182933 | 7/2004 |
| JP | 2006-089715 | 4/2006 |
| JP | 2007-146075 | 6/2007 |

OTHER PUBLICATIONS

Lin, S.-Y.; Lin, Y.-Y.; Chen, E.-M.; Hsu, C.-T.; Kwan, C.-C. Langmuir, 1999, 15, 4370-4376; American Chemical Society, 1999.*
International Search Report for PCT/JP2007/058432 mailed Jul. 10, 2007.
Supplementary European Search Report for EP 07741868 mailed Dec. 2, 2010.

* cited by examiner

*Primary Examiner* — Michael Pepitone
(74) *Attorney, Agent, or Firm* — Finnegan, Henderson, Farabow, Garrett & Dunner, L.L.P.

(57) ABSTRACT

An actinic ray curable composition comprising a photo-polymerizable compound and a photo-polymerization initiator, wherein the photo-polymerizable compound is a cationic polymerizable compound and a terminal polyether-modified silicone surfactant is further incorporated in the actinic ray curable composition.

14 Claims, 2 Drawing Sheets

ACTINIC RAY CURABLE COMPOSITION, ACTINIC RAY CURABLE INK-JET INK, IMAGE FORMING METHOD AND INK-JET RECORDING APPARATUS UTILIZING SAID ACTINIC RAY CURABLE INK-JET INK

FIELD OF THE INVENTION

The present invention relates to an actinic ray curable composition containing a photo-polymerizable compound, actinic ray curable ink-jet ink, and an image forming method and a recording apparatus which utilize said ink-jet ink.

BACKGROUND OF THE INVENTION

Heretofore, a curable composition, which is cured by actinic rays such as ultraviolet rays and electron rays, or by heat, has been utilized in practice for various applications such as paints, adhesives and printing inks on such as plastics, paper, wood and inorganic materials; printed circuit boards and electric insulation related materials. In recent years, as for printing ink, paints and adhesives among others, further improvement in weather-resistance and adhering capabilities have been sought. Further, as ink-jet ink utilizing these, ultraviolet curable ink-jet ink, which is cured by ultraviolet rays, is common. An ink-jet method utilizing this ultraviolet curable ink has attracted attention in recent years with respect to relatively low odor, rapid drying and capability of recording on non-paper recording media without an ink absorptive property, for which an ultraviolet curable ink-jet ink has been disclosed in such as Unexamined Japanese Patent Application Publication No. (hereinafter, referred to as JP-A) 6-200204 and Japanese Translation of PCT International Patent Application Publication No. 2000-504778. In this field, a major requirement is to exhibit high strength of the formed film and a low viscosity of the ink.

Further, in the case of utilizing this ink, curing sensitivity is liable to vary depending on the types of recording medium and working environment. When a cationic polymerizable compound is utilized, there is no oxygen inhibition effect, however, there is a problem of great influence of water content (moisture) at the molecular level (for example, please refer to Patent Documents 1, 2 and 3).

Further, when an image is formed by use of ink utilizing a cationic polymerizable compound, liquid ink drops are ejected onto a previously cured ink layer to also be cured, in this case, it has been newly proved that the diameter of a dot is liable to be broaden, which tends to blur the image.

Heretofore, as a control technology of the dot diameter of ejected UV curable ink-jet ink, addition of a silicone type or fluorine type surfactant has been disclosed (for example, please refer to Patent Documents 4, 5 and 6), however, it has been proved that although any of these is effective as a dot diameter control means, the nozzle surface of the head becomes easily wetted by ink, resulting in a problem such as poor ink ejection behavior and generation of stains on a printed matter, particularly in the case of utilizing an ink-jet head provided with a metal nozzle.

| [Patent Document 1] | JP-A | 2002-188025 |
| [Patent Document 2] | JP-A | 2002-317139 |
| [Patent Document 3] | JP-A | 2005-325155 |
| [Patent Document 4] | JP-A | 2003-147233 |

-continued

| [Patent Document 5] | JP-A | 2004-182933 |
| [Patent Document 6] | JP-A | 2005-120201 |

SUMMARY OF THE INVENTION

Problems to be Solved

This invention has been realized in view of the above situation. An object of this invention is to provide an actinic ray curable composition, ink-jet ink utilizing the same, an image forming method and an ink-jet recording apparatus, which is excellent in ejection behavior of the ink-jet ink, curable at high sensitivity, capable of forming a high quality image without stains as well as capable of forming a coated layer exhibiting a high film strength even under varying printing environments.

Means to Solve the Problems

The above object of this invention was realized by the following items:

Item 1. An actinic ray curable composition comprising a photo-polymerizable compound and a photo-polymerization initiator, wherein the photo-polymerizable compound is a cationic polymerizable compound and a terminal polyether-modified silicone surfactant is further incorporated in the actinic ray curable composition.

Item 2. The actinic ray curable-composition described in above Item 1, wherein an HLB value of the aforesaid terminal polyether-modified silicone surfactant is 9-30.

Item 3. The actinic ray curable composition described in above Item 2, wherein the HLB value of the aforesaid terminal polyether-modified silicone surfactant is 12-25.

Item 4. The actinic ray curable composition described in any one of above Items 1-3, wherein the cationic polymerizable compound comprises a compound having an oxetane ring and an epoxy compound.

Item 5. The actinic ray curable composition described in any one of above Items 1-4, wherein an added amount of the terminal polyether-modified silicone surfactant is 0.001-10 weight % based on a total weight of the actinic ray curable composition.

Item 6. An actinic ray curable ink-jet ink comprising an actinic ray curable composition described in any one of Items 1-5 and at least one kind of pigment.

Item 7. An image forming method in which actinic ray curable ink-jet ink described in above item 6 is ejected onto a recording medium to create a print on the recording medium, wherein actinic rays are irradiated over 0.001-1.0 second after landing of the actinic ray curable ink-jet ink onto the medium.

Item 8. An image forming method in which actinic ray curable ink-jet ink described in above Item 6 is ejected onto a recording medium to print an image onto the recording medium, wherein an minimum amount of ink droplets, which is ejected from each nozzle of the ink-jet recording head, is 2-15 pl.

Item 9. An ink-jet recording apparatus utilized in an image forming method described in Item 7 or 8, wherein an actinic ray curable ink-jet ink is ejected from the recording head after both an actinic ray curable ink and a recording head are heated to 35-100° C.

Item 10. The ink-jet recording apparatus utilized in an image forming method described in Item 7 or 8, wherein actinic ray curable ink is ejected onto a recording medium, which is heated to 35-60° C.

Effects of the Invention

According to this invention, it is now possible to provide an actinic ray curable composition, ink-jet ink utilizing the same, an image forming method and an ink-jet recording apparatus, which is excellent in ejection behavior by means of ink ejection, curable at high sensitivity, capable of forming a high quality image without stains as well as being capable of forming a coated layer of a high film strength even under various printing environments.

DETAILED DESCRIPTION OF THE INVENTION

Figure 1:
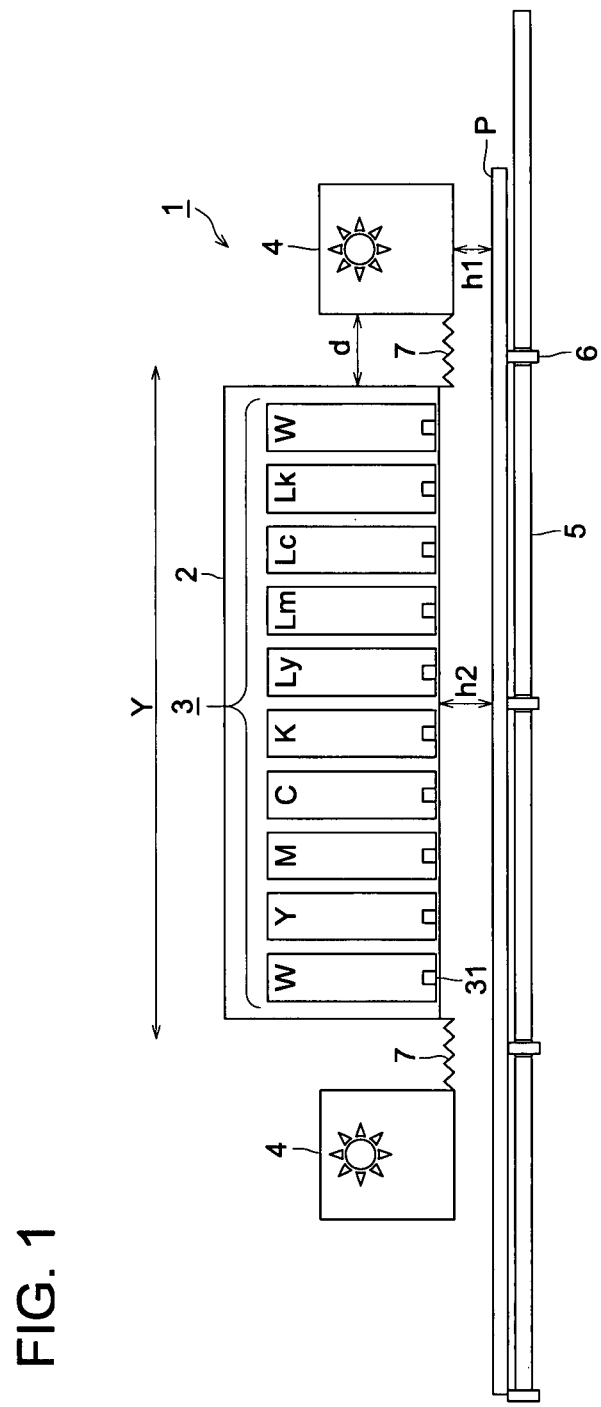
FIG. 1 is a front view showing an example of the primary constitution of an ink-jet recording apparatus of this invention.

Specific examples of a terminal polyether-modified silicone surfactant utilized in this invention include such as KF-6004, X-22-4272, 4952 and 6266, produced by Shin-Etsu Chemicals Co., Ltd.; and EFKA-3232 and EFKA-3033, produced by EFKA Corp.

A terminal polyether-modified silicone surfactant is preferably provided with said HLB value of 9-30, but more preferably 12-25. When the HLB value is less than 9, control of dot diameter is not compatible with wettability of a metal head nozzle, and the curing capability deteriorates when HLB is over 30.

The added amount of a terminal polyether-modified silicone surfactant according to this invention is preferably 0.001-10 weight % based on the total weight of the actinic ray curable composition.

"HLB value" referred here indicates a balance between hydrophilicity and hydrophobicity, being primarily applied for a nonionic surfactant, and is empirically a numerical value of 1-40 based on an emulsification experiment of oil. The smaller the number is, the stronger is the hydrophobicity, and conversely the larger the number, the stronger the hydrophilicity. In practice, clouding point A is measured to determine the HLB value according to the following conversion equation.

$$HLB = 0.89 \times (\text{clouding number } A) + 1.11$$

Clouding number A can be determined by dissolving 0.5 g of a silicone surfactant in 5 ml of ethanol, and the resulting solution is titrated with a 2% phenol aqueous solution. The time when the solution turns turbid is designated as the end point and the amount, in ml, of a 2% ethanol aqueous solution required until then is designated as the clouding number A.

<<Photo-Polymerizable Compound>>

(Compound Having Oxetane Ring)

In this invention, an oxetane compound, a conventionally well known oxetane compound can be utilized, but specifically preferably utilized can be an oxetane compound only the 3-position of which is substituted. Herein, as an oxetane compound only the 3-position of which is substituted, utilized can be those well known in the art such as described in JP-A Nos. 2001-220526 and 2001-310937.

An oxetane compound, only the 3-position of which is substituted, includes compounds represented by following Formula (1).

Formula (1)

In the formula, $R^1$ is a hydrogen atom, an alkyl group having a carbon number of 1-6 such as methyl, ethyl, propyl and butyl; a fluoroalkyl group having a carbon number of 1-6, an allyl group, an aryl group, a furyl group or a thienyl group. $R^2$ is an alkyl group having a carbon number of 1-6 such as methyl, ethyl, propyl and butyl; an alkenyl group having a carbon number of 2-6 such as 1-propenyl, 2-propenyl, propenyl, 2-methyl-1-propenyl, 2-methyl-2-propenyl, 1-butenyl, 2-butenyl and 3-butenyl; a group provided with an aromatic ring such as phenyl, benzyl, fluorobenzyl, methoxybenzyl and phenoxyethyl; an alkylcarbonyl group having a carbon number of 2-6 such as ethylcarbonyl, propylcarbonyl and butylcarbonyl; an alkoxycarbonyl group having a carbon number of 2-6 such as ethoxycarbonyl, propoxycarbonyl and butoxycarbonyl; an N-alkylcarbonyl group having a carbon number of 2-6 such as ethylcarbamoyl, propylcarbamoyl, butylcarbamoyl and pentylcarbamoyl.

As an oxetane compound utilized in this invention, a compound having one oxetane ring is specifically preferable with respect to excellent tackiness and a superior working property due to low viscosity.

An example of an oxetane compound provided with two oxetane rings includes compounds represented by following Formula (2).

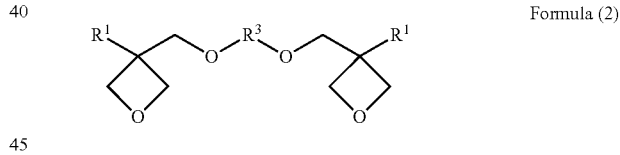

Formula (2)

In the formula, $R^1$ is identical with those in above-described Formula (1). $R^3$ is a linear or branched alkylene group such as ethylene, propylene and butylene; a linear or branched poly(alkyleneoxy) group such as poly(ethyleneoxy) and poly(propyleneoxy); a linear or branched unsaturated hydrocarbon group such as propenylene, methylpropenylene and butenylene; or a carbonyl group or an alkylene group containing a carbonyl group; an alkylene group containing a carboxyl group or an alkylene group containing a carbamoyl group.

Further, $R^3$ includes also a polyvalent group selected from groups represented by following Formulas (3), (4) and (5).

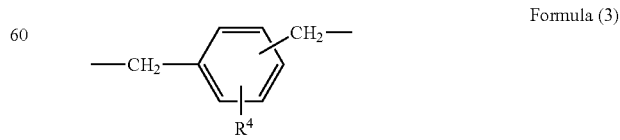

Formula (3)

In Formula (3), $R^4$ is a hydrogen atom, an alkyl group having a carbon number of 1-4 such as methyl, ethyl, propyl and butyl; an alkoxy group having a carbon number of 1-4 such as methoxy, ethoxy, propoxy and butoxy; a halogen atom such as chlorine and bromine; a nitro group, a cyano group, a mercapto group, a lower alkoxycarbonyl group, carboxyl group or carbamoyl group.

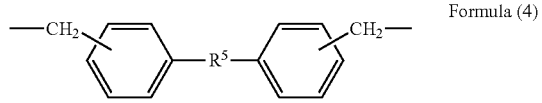

Formula (4)

In Formula (4), $R^5$ is an oxygen atom, a sulfur atom, a methylene group, NH, SO, $SO_2$, $C(CF_3)_2$ or $C(CH_3)_2$.

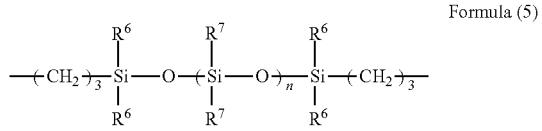

Formula (5)

In Formula (5), $R^6$ is an alkyl group having a carbon number of 1-4 such as methyl, ethyl, propyl and butyl; or an aryl group. n is 0 or an integer of 1-2,000. $R^7$ is an alkyl group having a carbon number of 1-4 such as methyl, ethyl, propyl and butyl; or an aryl group. $R^7$ also includes a group selected from groups represented by following Formula (6).

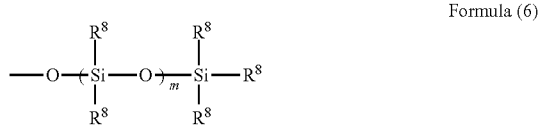

Formula (6)

In Formula (6), $R^8$ is an alkyl group having a carbon number of 1-4 such as methyl, ethyl, propyl and butyl; or an aryl group. m is 0 or an integer of 1-100.

Specific examples of a compound having two oxetane rings include the following exemplary compound 1 and 2.

Exemplary Compound 1

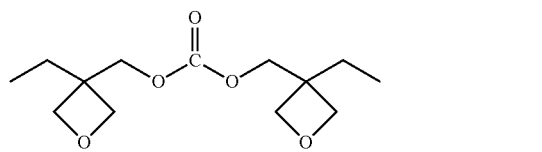

Exemplary Compound 2

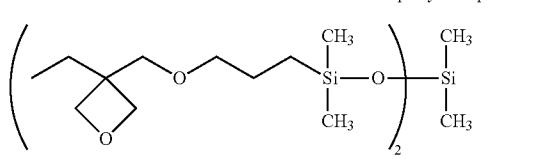

Exemplary compound 1 is a compound of aforesaid Formula (2) in which $R^1$ is ethyl and $R^3$ is a carboxyl group. Further, exemplary compound 2 is a compound of aforesaid Formula (2); in which $R^1$ is an ethyl group and $R^3$ is a compound of aforesaid Formula (5), in which $R^6$ and $R^7$ are a methyl group and n is 1.

In a compound having two oxetane rings, examples other than the above described compounds are compounds represented by following Formula (7). In Formula (7), $R^1$ is identical with $R^1$ in aforesaid Formula (1).

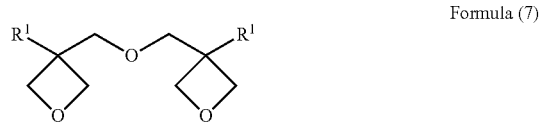

Formula (7)

Further, an example of a compound having 3-4 oxetane rings includes compounds represented by following Formula (8).

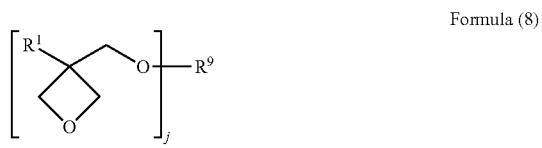

Formula (8)

In Formula (8), $R^1$ is identical with $R^1$ in aforesaid Formula (1). $R^9$ includes a branched alkylene group having a carbon number of 1-12 such as groups represented by following A-C, a branched poly(alkyleneoxy) group such as groups represented by following D, or a branched poly(siloxy) group such as groups represented by following E.

A

B

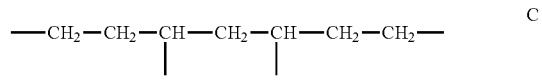

C

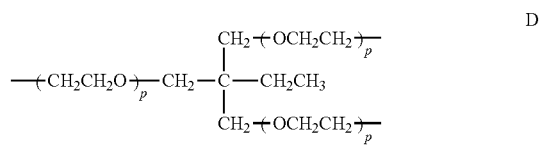

D

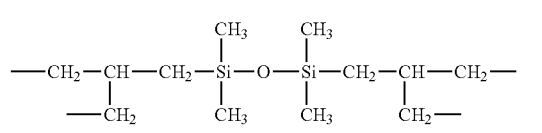

E

In above-described A, $R^{10}$ is a lower alkyl group such as methyl, ethyl, and propyl. Further, in above-described D, p is an integer of 1-10.

An example of a compound having 3-4 oxetane rings includes exemplary compound 3.

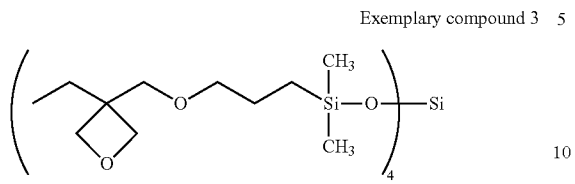

Exemplary compound 3

Further, an example of a compound having 1-4 oxetane rings other than those explained above includes compounds represented by following Formula (9).

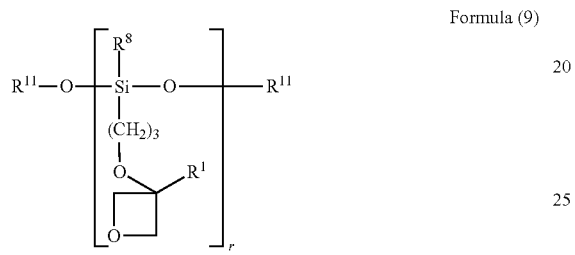

Formula (9)

In Formula (9), $R^8$ is identical with $R^8$ in aforesaid Formula (6). $R^{11}$ is an alkyl group having a carbon number of 1-4 such as methyl, ethyl, propyl and butyl; or a trialkylsilyl group, and r is 1-4.

Preferable specific examples of an oxetane compound according to this invention include exemplary compounds 4, 5 and 6, which are described below.

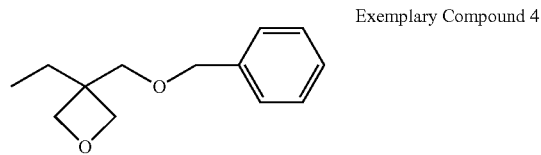

Exemplary Compound 4

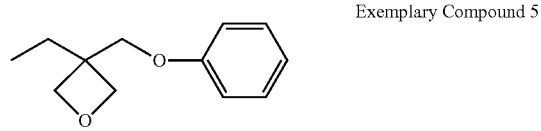

Exemplary Compound 5

Exemplary Compound 6

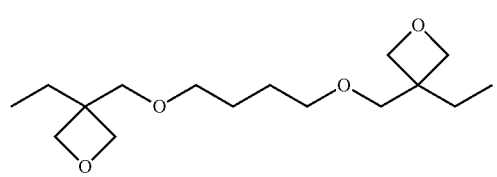

A manufacturing method of the above-described compounds having an oxetane ring is not specifically limited and may be referred to a conventionally well known method such as an oxetane ring synthesis method from diol, which is disclosed by D. B. Pattison (J. Am. Chem. Soc., 3455, 79 (1957)). Further, in addition to these, listed are compounds provided with 1-4 oxetane rings and having a high molecular weight of approximately 1,000-5,000. Specific example compounds thereof include following exemplary compounds 7, 8 and 9.

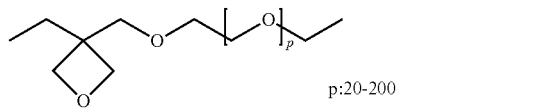

Exemplary Compound 7 p:20-200

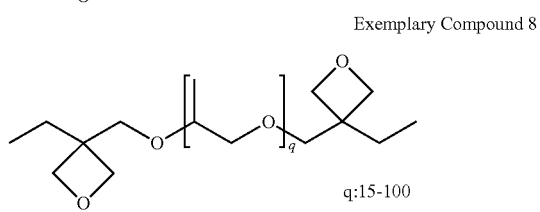

Exemplary Compound 8 q:15-100

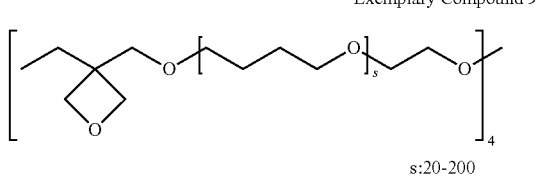

Exemplary Compound 9 s:20-200

As compound having an oxetane ring of this invention, preferably utilized is also the $2^{nd}$ position substituted oxetane compound.

In an actinic ray curable composition, preferably utilized is an oxetane compound having at least one oxetane ring, the 2-position of which is substituted in the molecule, represented by following Formula (10).

Formula (10)

In the formula, $R_1$-$R_6$ are each a hydrogen atom or a substituent. However, at least one of the groups represented by $R_1$-$R_6$ is to be a substituent. Substituents represented by $R_1$-$R_6$ include such as fluorine atom, an alkyl group having a carbon number of 1-6 (such as a methyl, ethyl, propyl and butyl group), a fluoralkyl group having a carbon number of 1-6, an allyl group, an aryl group (such as a phenyl and naphthyl group), a furyl group or a thienyl group. Further these groups may be further provided with a substituent.

(Oxetane Compound Having One Oxetane Ring in Molecule)

Further, among above-described Formula (10) compounds represented by following Formulas (11)-(14) are preferable.

Formula (11)

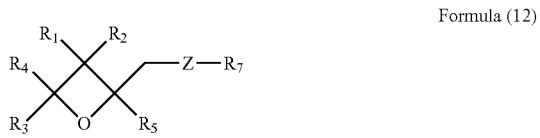

Formula (12)

Formula (13)

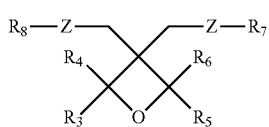

Formula (14)

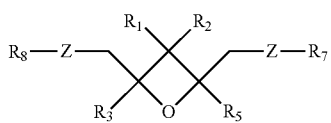

In the formulas, $R_1$-$R_6$ are each a hydrogen atom or a substituent; $R_7$ and $R_8$ are each a substituent; and Z is independently an oxygen or sulfur atom, or a divalent hydrocarbon which may contain an oxygen or sulfur atom in the main chain. Substituents represented by $R_1$-$R_6$ of Formulas (11)-(14) are identical to substituents represented by $R_1$-$R_6$ of Formula (10).

Substituents represented by $R_7$ and $R_8$ include an alkyl group having a carbon number of 1-6 (such as a methyl, ethyl, propyl and butyl group), an alkenyl group having a carbon number of 1-6 (such as a 1-propenyl, 2-propenyl, 2-methyl-1-propenyl, 2-methyl-2-propenyl, 1-butenyl, 2-butenyl and 3-butenyl group), an aryl group (such as a phenyl and naphthyl group), an aralkyl group (such as a benzyl, fluorobenzyl and methoxybenzyl group), an acyl group having a carbon number of 1-6 (such as a propylcarbonyl, butylcarbonyl and pentylcarbonyl group), an alkoxycarbonyl group having a carbon number of 1-6 (such as an ethoxycarbonyl, propoxycarbonyl and butoxycarbonyl group), an alkylcarbamoyl group having a carbon number of 1-6 (such as a propylcarbamoyl, butylcarbampyl and pentylcarbamoyl group), and an alkoxycarbamoyl group (such as an ethoxycarbamoyl group).

An oxygen or sulfur atom, or a divalent hydrocarbon which may contain an oxygen or sulfur atom in the main chain, represented by Z, includes an alkylene group (such as an ethylene, trimethylene, tetramethylene, propylene, ethylethylene, pentamethylene, hexamethylene, heptamethylene, octamethylene, nonamethylene and decamethylene group), an alkenylene group (such as a vinylene and propenylene group); an alkenylene group (such as an ethynylene and 3-pentynylene group), and a carbon atom in the aforesaid alkylene group, an alkenylene group or an alkynylene group may be substituted by an oxygen atom or a sulfur atom.

In the above substituents, $R_1$ is preferably a lower alkyl group (such as a methyl, ethyl and propyl group) but specifically preferably is an ethyl group. Further, $R_7$ and $R_8$ are preferably a propyl, butyl, phenyl or benzyl group, and Z is preferably a hydrocarbon group (such as an alkylene group, an alkenylene group or an alkynylene group), containing no oxygen or sulfur atoms.

(Compound Containing at Least Two Oxetane Rings in its Molecule)

Further, in this invention, a compound provided with at least two oxetane rings in its molecule, such as represented by following Formulas (15) and (16), may be utilized.

Formula (15)

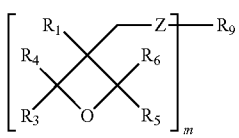

Formula (16)

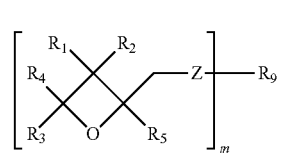

In the formulas, Z is identical to a group utilized in aforesaid Formulas (11)-(14), and "m" is 2-4. $R_1$-$R_6$ are a hydrogen atom, a fluorine atom, an alkyl group having a carbon number of 1-6 (such as a methyl, ethyl, propyl and butyl group), a fluoroalkyl group having a carbon number of 1-6, an allyl group, an aryl group (such as a phenyl and naphthyl group), or a furyl group. Herein, in Formula (15), at least one of $R_3$-$R_6$ is to be a substituent.

$R_9$ is a linear or branched alkylene group, or a linear or branched poly(alkyleneoxy) group, which have a carbon number of 1-12; or a divalent group selected from a group comprising following Formulas (18), (19) and (20).

As an example of the above branched alkylene group having a carbon number of 1-12, and an alkylene group represented by following Formula (17) is preferable.

Formula (17)

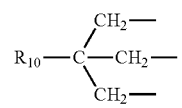

In the formula, $R_{10}$ is a lower alkyl group (such as a methyl, ethyl and propyl group).

Formula (18)

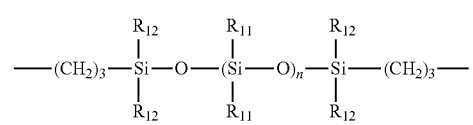

In the formula, "n" is 0 or an integer of 1-2,000, $R_{12}$ is an alkyl group having a carbon number of 1-10 (such as a methyl, ethyl, propyl, butyl, pentyl, hexyl, heptyl, octyl and nonyl group), $R_{11}$ is an alkyl group having a carbon number of 1-10 (such as a methyl, ethyl, propyl, butyl, pentyl, hexyl, heptyl, octyl and nonyl group) or a group represented by following Formula (21).

Formula (21)

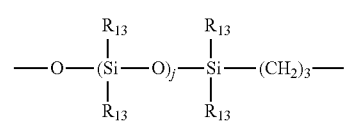

In the formula, "j" is 0 or an integer of 1-100, $R_{13}$ is an alkyl group having a carbon number of 1-10 (such as a methyl, ethyl, propyl, butyl, pentyl, hexyl, heptyl, octyl and nonyl group).

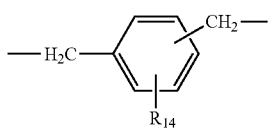

Formula (19)

In the formula, $R_{14}$ is an alkyl group having a carbon number of 1-10 (such as a methyl, ethyl, propyl, butyl, pentyl, hexyl, heptyl, octyl and nonyl group), an alkoxy group having a carbon number of 1-10 (such as a methoxy, ethoxy, propoxy, butoxy and pentoxy group), a halogen atom (such as a fluorine, chlorine, bromine and iodine atom), a nitro group, a cyano group, a mercapto group, an alkoxycarbonyl group (such as a methoxycarbonyl, ethoxycarbonyl and butoxycarbonyl group), or a carboxyl group.

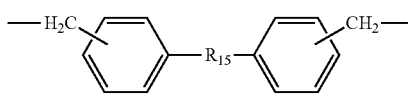

Formula (20)

In the formula, $R_{15}$ is an oxygen atom, a sulfur atom, —NH—, —SO—, —SO$_2$—, —CH$_2$—, —C(CH$_3$)$_2$— or —C(CF$_3$)$_2$—.

As an embodiment of a preferable partial structure of a compound having an oxetane ring, which is utilized in this invention, for example, in above-described Formulas (15) and (16), $R_1$ is preferably a lower alkyl group (such as a methyl, ethyl and propyl group) but is specifically preferably an ethyl group. Further, $R_9$ is preferably a hexamethylene group or above-described Formula (19) in which $R_{14}$ is a hydrogen atom.

In above-described Formula (17), $R_{10}$ is an ethyl group, $R_{12}$ and $R_{13}$ are a methyl group and Z is preferably a hydrocarbon-group containing no oxygen nor sulfur atom.

Further, an example of a preferable embodiment of a compound having an oxetane ring includes compounds represented by following Formula (22).

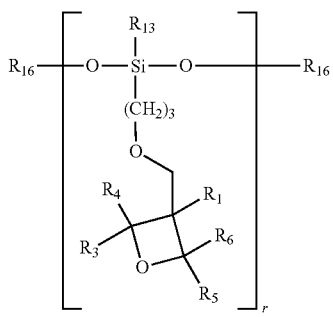

Formula (22)

In which formula, "r" is an integer of 25-200, $R_{16}$ is an alkyl group having a carbon number of 1-4 (such as a methyl, ethyl, propyl and butyl group), or a trialkylsilyl group. $R_1$, $R_3$, $R_5$ and $R_6$ are identical to substituents represented by $R_1$-$R_6$ in above-described Formula (10). Herein, at least one of $R_3$-$R_6$ is to be a substituent.

In the following, specific examples of a compound featuring an oxetane ring, the 2-position of which is substituted, will be shown as example compounds 10-24, however, this invention is not limited thereto.

10: Trans-3-t-butyl-phenyloxetane
11: 3,3,4,4-Tetramethyl-2,2-diphenyloxetane
12: Di[3-ethyl(2-methoxy-3-oxetanyl)]methyl ether
13: 1,4-Bis(2,3,4,4-tetramethyl-3-ethyloxetanyl)butane
14: 1,4-Bis(3-methyl-3-ethyloxetanyl)butane
15: Di(3,4,4-trimethyl-3-ethyloxetanyl)methyl ether
16: 3-(2-Ethyl-hexyloxymethyl)-2,2,3,4-tetramethyloxetane
17: 2-(2-Ethyl-hexyloxy)-2,3,3,4,4-pentamethyloxetane
18: 4,4-Bis[(2,4-dimethyl-3-ethy-3-oxetanyl)methoxy]biphenyl
19: 1,7-Bis(2,3,3,4,4-pentamethyl-oxetanyl)heptane
20: Oxetanyl.silsesquioxane
21: 2-Methoxy-3,3-dimethyloxetane
22: 2,2,3,3-Tetramethyloxetane
23: 2-(4-Methoxyphenyl)-3,3-dimethyloxetane
24: Di(2-(4-methoxyphenyl)-3-methyloxetane-3-yl)ether Synthesis of a compound having an oxetane ring at least the 2-position of which is substituted according to this invention, can be performed by referring to the literature described below.

1) Hu Xianming, Richard M. Kellogg, Synthesis, 533-538, May 2) A. O. Fitton, J. Hill, D. Ejane, R. Miller, Synth., 12, 1140 3) Toshiro Imai and Shinya Nishida, Can. J. Chem., vol. 59, 2503-2509 4) Nobujiro Shimizu, Shintaro Yamaoka, and Yuho Tsuno, Bull. Chem. Soc. Jpn., 56, 3853-3854 5) Walter Fisher and Cyril A. Grob, Helv. Chim. Acta., 61, 2336 6) Chem. Ber., 101, 1850 7) "Heterocyclic Compounds with Three- and Four-membered Rings", Part Two, Chapter IX, Interscience Publishers, John Wiley & Sons, New York 8) Bull. Chem. Soc. Jpn., 61, 1653 9) Pure Appl. Chem., A29, 915 10) Pure Appl. Chem., A30 (2 & amp; 3), 189 (1993)

11) JP-A 6-16804
12) German Patent No. 1,021,858

The content of a compound having an oxetane ring of this invention, in actinic ray curable ink-jet ink, is preferably 1-97 weight %, but more preferably 30-95 weight %.

(Epoxy Compound)

In this invention, as an epoxy compound, either monomer of a compound having an epoxy group or oligomer thereof can be utilized. Specifically, listed are an aromatic epoxy compound, an alicyclic epoxy compound and an aliphatic epoxy compound, which are conventionally well known in the art. Hereinafter, an epoxy compound means monomer or oligomer thereof. Oligomer in this invention is preferably a compound having a low molecular weight and oligomer having a molecular weigh of less than 1,000 is more preferable.

A preferable aromatic epoxy compound is di- or poly-glycidyl ether, which is prepared by a reaction of a polyhydric phenol having at least one aromatic nucleus or alkylene oxide adduct thereof, with epichlorohydrin, and for example includes di- or poly-glycidyl ether of bisphenol A or alkylene oxide adduct thereof, di- or poly-glycidyl ether of hydrogenated bisphenol A or alkylene oxide adduct thereof, and novolak type epoxy resin. Herein, alkylene oxide includes such as ethylene oxide and propylene oxide.

An alicyclic epoxy compound is preferably a cyclohexeneoxide or cyclopenteneoxide containing compound, which is prepared by epoxidation of a compound having at least one cycloalkene ring such as a cyclohexene or cyclopentene ring by an appropriate oxidant such as hydrogen peroxide and peracid, and specifically includes compounds described below.

A preferable aliphatic epoxy compound is such as di- or poly-glycidyl ether of aliphatic polyhydric alcohol or alkyleneoxide adduct thereof, and typically includes diglycidyl ether of alkylene glycol such as diglycidyl ether of ethylene glycol, diglycidyl ether of propylene glycol or diglycidyl ether of 1,6-hexanediol; polyglycidyl ether of polyhydric alcohol such as di- or tri-glycidyl ether of glycerin or alkyleneoxide adduct thereof; and diglycidyl ether of polyalkylene glycol such as diglycidyl ether of polyethylene glycol or alkylene oxide adduct thereof and diglycidyl ether of polypropylene glycol or alkylene oxide adduct thereof. Herein alkylene oxide includes such as ethylene oxide and propylene oxide.

Further, in addition to these compounds, monoglycidyl ether of aliphatic higher alcohol as monomer having one oxirane ring in a molecule and monoglycidyl ether of phenol or cresol can be utilized. Among these epoxy compounds, in consideration of a rapid curing capability, an aromatic epoxy compound and an alicyclic epoxy compound are preferred and an alicyclic epoxy compound is specifically preferred. In this invention, one type of the above-described epoxy compounds alone may be utilized, however, not less than two types may be also utilized in combination.

Specifically, an alicyclic epoxy compound is those represented by following formula (A).

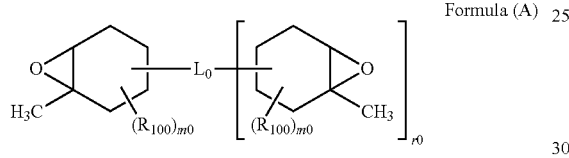

Formula (A)

In the formula, $R_{100}$ is a substituent, m0 is 0-2, and r0 is 1-3. $L_0$ is an r0+1 valent connecting group, which may contain an oxygen atom or a sulfur atom in the main chain and has a carbon number of 1-15, or a single bond.

Further, a compound represented by aforesaid formula (A) is preferably at least one type selected from following formulas (I)-(IV).

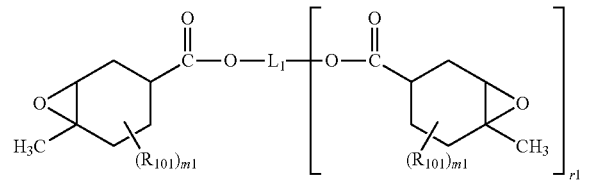

Formula (I)

In the formula, $R_{101}$ is a substituent, m1 is 0-2, r1 is 1-3. $L_1$ is an r1+1 valent connecting group, which may contain an oxygen atom or a sulfur atom in the main chain and has a carbon number of 1-15, or a single bond.

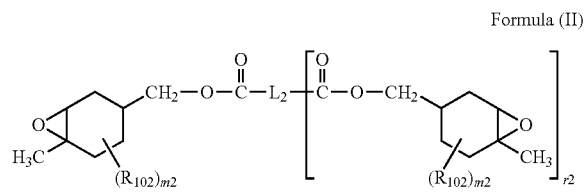

Formula (II)

In the formula, $R_{102}$ is a substituent, m2 is 0-2, r2 is 1-3. $L_2$ is an r2+1 valent connecting group, which may contain an oxygen atom or a sulfur atom in the main chain and has a carbon number of 1-15, or a single bond.

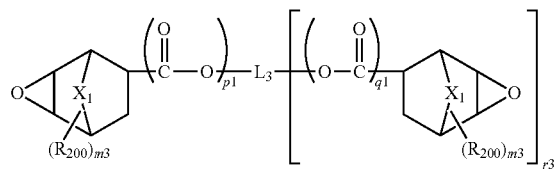

Formula (III)

In the formula, $R_{200}$ is an aliphatic group at positions except α and β positions of an oxirane ring, and m3 is 0-2. $X_1$ is —$(CH_2)_{n0}$— or —$(O)_{n0}$—, and n0 is 0 or 1. p1 and q1 each are 0 or 1 and are never simultaneously 0. r3 is 1-3. $L_3$ is an r3+1 valent connecting group provided with a branched structure, which may contain an oxygen atom or a sulfur atom in the main chain and has a carbon number of 1-15, or a single bond.

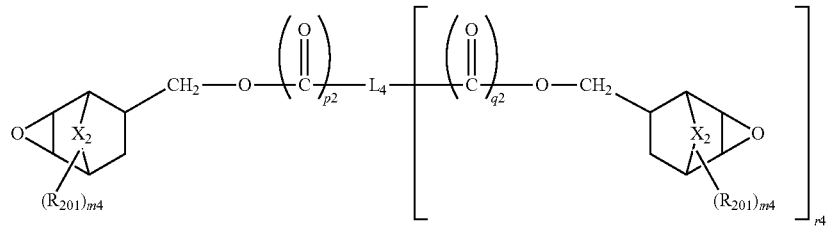

Formula (IV)

In the formula, $R_{201}$ is an aliphatic group at positions except α and β positions of an oxirane ring, and m4 is 0-2. $X_2$ is —$(CH_2)_{n1}$— or —$(O)_{n1}$—, and n1 is 0 or 1. p2 and q2 each are 0 or 1 and are never simultaneously 0. r4 is 1-3. $L_4$ is an r4+1 valent connecting group provided with a branched structure, which may contain an oxygen atom or a sulfur atom in the main chain and has a carbon number of 1-15, or a single bond.

An alicyclic epoxy compound represented by above-described formula (A), (I) or (II) will be explained.

In formula (A), (I) or (II), substituents represented by $R_{100}$, $R_{101}$ or $R_{103}$ include a halogen atom (such as chlorine, bromine and fluorine), an alkyl group having a carbon number of 1-6 (such as methyl, ethyl, propyl, i-propyl and butyl), an alkoxy group having a carbon number of 1-6 (such as methoxy, ethoxy, propoxy, i-propoxy, butoxy and t-butoxy), an acyl group (such as acetyl, propionyl and trifluoroacetyl), an acyloxy group (such as acetoxy, propionyloxy and trifluoroacetoxy), and an alkoxycarbonyl group (such as methoxycarbonyl, ethoxycarbonyl and t-butoxycarbonyl). A preferable substituent is an alkyl group, an alkoxy group or an alkoxycarbonyl group.

m0, m1 and m2 are 0 or an integer of 1-2, however, are preferably 0 or 1. Further, m0, m1 and m2 may be different from each other in the same molecule.

$L_0$ is an r0+1 valent connecting group, which may contain an oxygen atom or a sulfur atom in the main chain and has a carbon number of 1-15, or a single bond; $L_1$ is an r1+1 valent connecting group, which may contain an oxygen atom or a sulfur atom in the main chain and has a carbon number of 1-15, or a single bond; and $L_2$ is an r2+1 valent connecting group, which may contain an oxygen atom or a sulfur atom in the main chain and has a carbon number of 1-15, or a single bond.

An example of a divalent connecting group, which may contain an oxygen atom or a sulfur atom in the main chain and has a carbon number of 1-15, includes the following groups and groups formed by combining the these groups and plural number of —O— group, —S— group, —CO— group and —CS— group.

Methylene group [—$CH_2$—]
Ethylidene group [>$CHCH_3$]
i-Propylidene group [>$C(CH_3)_2$]
1,2-Ethylene group [—$CH_2CH_2$—]
1,2-Propylene group [—$CH(CH_3)CH_2$—]
1,3-Propanediyl group [—$CH_2CH_2CH_2$—]
2,2-Dimethyl-1,3-propanediyl group [—$CH_2C(CH_3)_2CH_2$—]
2,2-Dimethoxy-1,3-propanediyl group [—$CH_2C(OCH_3)_2CH_2$—]
2,2-Dimethoxymethyl-1,3-propanediyl group [—$CH_2C(CH_2OCH_3)_2CH_2$—]
1-Methyl-1,3-propanediyl group [—$CH(CH_3)CH_2CH_2$—]
1,4-Butanediyl group [—$CH_2CH_2CH_2CH_2$—]
1,5-Pentanediyl group [—$CH_2CH_2CH_2CH_2CH_2$—]
Oxydiethylene group [—$CH_2CH_2OCH_2CH_2$—]
Thiodiethylene group [—$CH_2CH_2SCH_2CH_2$—]
3-Oxthothiodiethylene group [—$CH_2CH_2SOCH_2CH_2$—]
3,3-Dioxthothiodiethylene group [—$CH_2CH_2SO_2CH_2CH_2$—]
1,4-Dimethyl-3-oxa-1,5-pentadiyl group [—$CH(CH_3)CH_2OCH(CH_3)CH_2$—]
3-Oxopentanediyl group [—$CH_2CH_2COCH_2CH_2$—]
1,5-Dioxo-3-oxapentanediyl group [—$COCH_2OCH_2CO$—]
4-Oxa-1,7-heptanediyl group [—$CH_2CH_2CH_2OCH_2CH_2CH_2$—]
3,6-Dioxa-1,8-octanediyl group [—$CH_2CH_2OCH_2CH_2OCH_2CH_2$—]
1,4,7-Trimethyl-3,6-dioxa-1,8-octanediyl group [—$CH(CH_3)CH_2O$—$CH(CH_3)CH_2OCH(CH_3)CH_2$—]
5,5-Dimethyl-3,7-dioxa-1,9-nonanediyl group [—$CH_2CH_2OCH_2C(CH_3)_2CH_2OCH_2CH_2$—]
5,5-Dimethoxy-3,7-dioxa-1,9-nonanediyl group [—$CH_2CH_2OCH_2C(OCH_3)_2CH_2OCH_2CH_2$—]
5,5-Dimethoxymethyl-3,7-dioxa-1,9-nonanediyl group [—$CH_2CH_2OCH_2C(CH_2OCH_3)_2CH_2OCH_2CH_2$—]
4,7-Dioxo-3,8-dioxa-1,10-decanediyl group [—$CH_2CH_2OCOCH_2CH_2COOCH_2CH_2$—]
3,8-Dioxo-4,7-dioxa-1,10-decanediyl group [—$CH_2CH_2COOCH_2CH_2OCOCH_2CH_2$—]
1,3-Cyclopentanediyl group [-1,3-$C_5H_8$—]
1,2-Cyclohexanediyl group [-1,2-$C_6H_{10}$—]
1,3-Cyclohexanediyl group [-1,3-$C_6H_{10}$—]
1,4-Cyclohexanediyl group [-1,4-$C_6H_{10}$—]
2,5-Tetrahydrofurandiyl group [2,5-$C_4H_6O$—]
p-Phenylene group [-p-$C_6H_4$—]
m-Phenylene group [-m-$C_6H_4$—]
α,α'-o-Xylylene group [-o-$CH_2$—$C_6H_4$—$CH_2$—]
α,α'-m-Xylylene group [-m-$CH_2$—$C_6H_4$—$CH_2$—]
α,α'-p-Xylylene group [-p-$CH_2$—$C_6H_4$—$CH_2$—]
Furan-2,5-diyl-bismethylene group [2,5-$CH_2$—$C_4H_2O$—$CH_2$—]
Thiophen-2,5-diyl-bismethylene [2,5-$CH_2$—$C_4H_2S$—$CH_2$—]
i-Propylidenbis-p-phenylene [-p-$C_6H_4$—$C(CH_3)_2$-p-$C_6H_4$—]

A not less than tri-valent connecting group includes groups which are formed by removing necessary hydrogen atoms at arbitrary positions from the divalent groups listed above, and groups formed by combining them with a plural number of a —O— group, a —S— group, a —CO— group or a —CS— group.

$L_0$, $L_1$ and $L_2$ each may be provided with a substituent. Examples of a substituent include a halogen atom (such as chlorine, bromine and fluorine), an alkyl group having a carbon number of 1-6 (such as methyl, ethyl, propyl, i-propyl and butyl), an alkoxy group having a carbon number of 1-6 (such as methoxy, ethoxy, propoxy, i-propoxy, butoxy and t-butoxy), an acyl group (such as acetyl, propionyl and trifluoroacetyl), an acyloxy group (such as acetoxy, propionyloxy and trifluoroacetoxy) and an alkoxycarbonyl group (such as methoxycarbonyl, ethoxycarbonyl and t-butoxycarbonyl). A preferable substituent is an alkyl group, an alkoxy group or an alkoxycarbonyl group. $L_0$, $L_1$ and $L_2$ each are preferably a divalent connecting group which may contain an oxygen atom or a sulfur atom in the main chain and having a carbon number of 1-8, and more preferable is a divalent connecting group the main chain of which is comprised of carbon atoms. Preferable substituents are an alkyl group, an alkoxy group and an alkoxycarbonyl group. $L_0$, $L_1$ and $L_2$ each are preferably a divalent connecting group which may contain an oxygen atom or a sulfur atom in the main chain and has a carbon number of 1-8, and more preferably a divalent connecting group the main chain of which is comprised of only carbon.

In this invention, incorporated are a compound having an oxetane ring and an alicyclic epoxy compound having at least two ester bonds as a photo-polymerizable compound. A compound represented by either of aforesaid formula (III) or (IV) is preferred.

In the above formulas, an aliphatic group represented by $R_{200}$ and $R_{201}$ includes an alkyl group having a carbon number of 1-6 (such as methyl, ethyl, propyl, i-propyl and butyl), a cycloalkyl group having a carbon number of 3-6 (such as cyclopropyl, cyclobutyl, cyclopentyl and cyclohexyl), an alkenyl group having a carbon number of 1-6 (such as vinyl, 1-propenyl, 2-propenyl and 2-butenyl), an alkynyl group having a carbon number of 1-6 (such as acetylenyl, 1-propynyl, 2-propynyl and 2-butynyl). Preferable is an alkyl group having a carbon number of 1-3, and more preferable are a methyl group and an ethyl group.

m3 and m4 are 0-2, however, preferably not less than 1.

$X_1$ is —$(CH_2)_{n0}$— or —$(O)_{n0}$—, and $X_2$ is —$(CH_2)_{n1}$— or —$(O)_{n1}$—. n0 and n1 is 0 or 1, and $X_1$ and $X_2$ are not present when n0 and n1 are 0.

m3+n0 or m4+n1 is preferably not less than 1.

$L_3$ is an r3+1 valent connecting group provided with a branched structure, which may contain an oxygen atom or a sulfur atom in the main chain and has a carbon number of 1-15, or a single bond; $L_4$ is an r4+1 valent connecting group provided with a branched structure, which may contain an oxygen atom or a sulfur atom in the main chain and has a carbon number of 1-15, or a single bond.

A divalent connecting group, which may contain an oxygen atom or a sulfur atom in the main chain and has a carbon number of 1-15, includes the following groups and groups formed by combining said groups with a plural number of —O— group, —S— group, —CO— group and —CS— group.

Ethylidene group [>CHCH$_3$]
1-Propylidene group [>C(CH$_3$)$_2$]
2,2-Dimethyl-1,3-propanediyl group [—CH$_2$C(CH$_3$)$_2$CH$_2$—]
2,2-Dimethoxy-1,3-propanediyl group [—CH$_2$C(OCH$_3$)$_2$CH$_2$—]
2,2-Dimethoxymethyl-1,3-propanediyl group [—CH$_2$C(CH$_2$OCH$_3$)$_2$CH$_2$—]
1-Methyl-1,3-propanediyl group [—CH(CH$_3$)$_2$CH$_2$CH$_2$—]
1,4-Dimethyl-3-oxa-1,5-pentadiyl group [—CH(CH$_3$)CH$_2$OCH(CH$_3$)CH$_2$—]
1,4,7-Trimethyl-3,6-dioxa-1,8-octanediyl group [—CH(CH$_3$)CH$_2$OCH(CH$_3$)CH$_2$OCH(CH$_3$)CH$_2$—]
5,5-Dimethyl-3,7-dioxa-1,9-nonanediyl group [—CH$_2$CH$_2$OCH$_2$C(CH$_3$)$_2$CH$_2$OCH$_2$CH$_2$—]
5,5-Dimethoxy-3,7-dioxa-1,9-nonanediyl group [—CH$_2$CH$_2$OCH$_2$C(OCH$_3$)$_2$CH$_2$OCH$_2$CH$_2$—]
5,5-Dimethoxymethyl-3,7-dioxa-1,9-nonanediyl group [—CH$_2$CH$_2$OCH$_2$C(CH$_2$OCH$_3$)$_2$CH$_2$OCH$_2$CH$_2$—]
i-Propylidenbis-p-phenylene group [-p-C$_6$H$_4$—C(CH$_3$)$_2$p-C$_6$H$_4$—]

A connecting group of not less than trivalent includes a group comprising a combination of a group, which is formed by removing a necessary number of hydrogen atoms at arbitrary portions from a divalent connecting group described above, with a group, which is formed combining a plural number of —O— group, —S— group, —CO— group and —CS— group.

L$_3$ and L$_4$ may be provided with a substituent. Examples of the substituent include a halogen atom (such as chlorine, bromine and fluorine), an alkyl group having a carbon number of 1-6 (such as methyl, ethyl, propyl, i-propyl and butyl), an alkoxy group having a carbon number of 1-6 (such as methoxy, ethoxy, propoxy, i-propoxy, butoxy and t-butoxy), an acyl group (such as acetyl, propionyl and trifluoroacetyl), an acyloxy group (such as acetoxy, propionyloxy and trifluoroacetoxy), and an alkoxycarbonyl group (such as methoxycarbonyl, ethoxycarbonyl and t-butoxycarbonyl). Preferable substituents are a halogen atom, an alkyl group and an alkoxy group.

In the following, exemplary compounds of formulas (A), (I), (II), (III) and (IV) will be shown.

EP-1

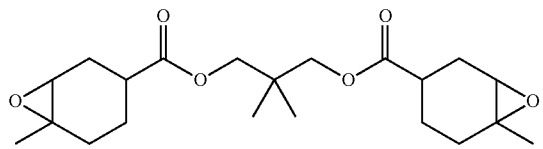

molecular weight: 380.48

EP-2

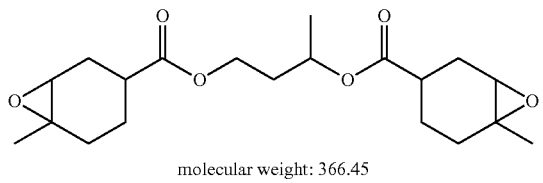

molecular weight: 366.45

EP-3

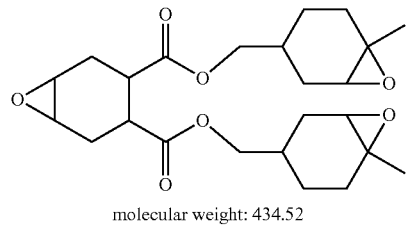

molecular weight: 434.52

EP-4

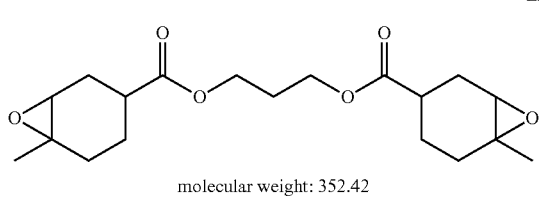

molecular weight: 352.42

EP-5

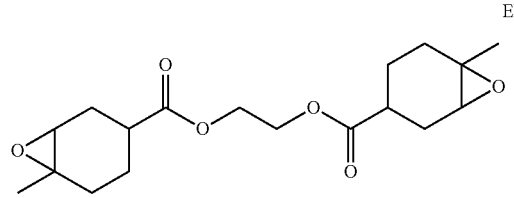

molecular weight: 338.40

EP-6

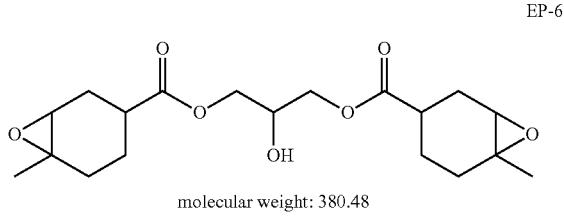

molecular weight: 380.48

EP-7

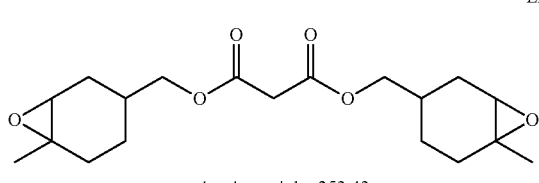

molecular weight: 352.42

EP-8

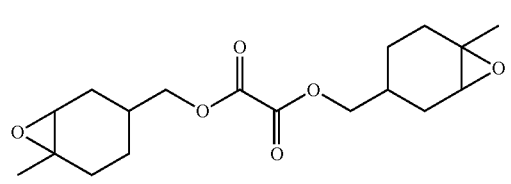

molecular weight: 338.40

EP-9

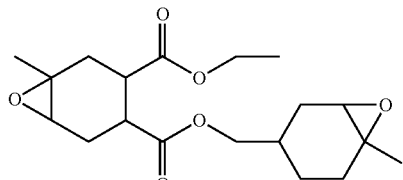

molecular weight: 352.42

EP-10

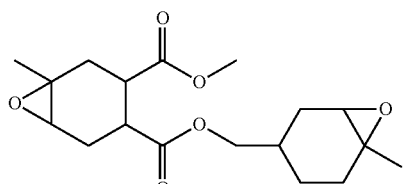

molecular weight: 338.4

EP-11

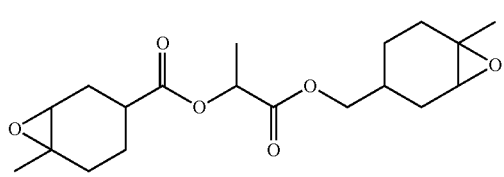

molecular weight: 352.42

EP-12

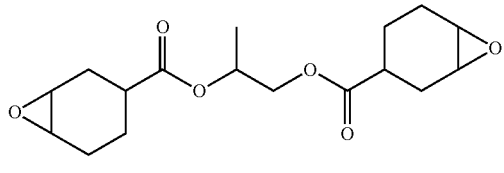

EP-13

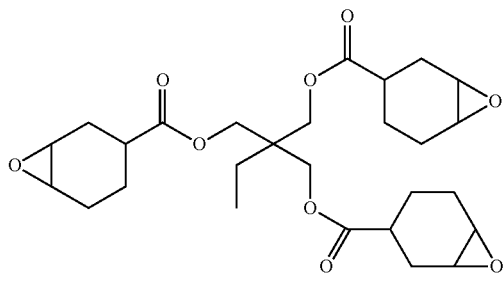

EP-14

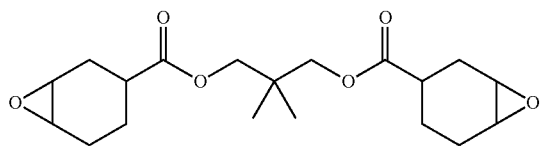

EP-15

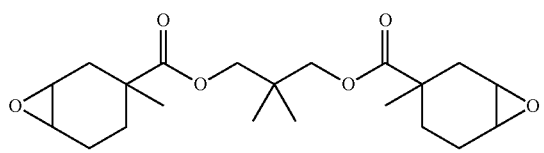

EP-16

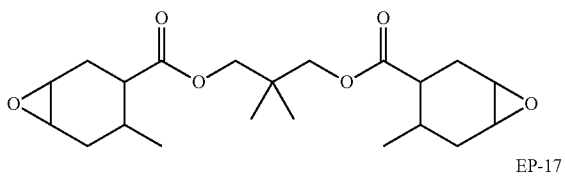

EP-17

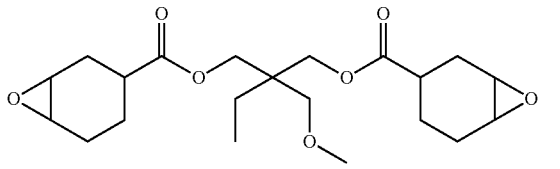

EP-18

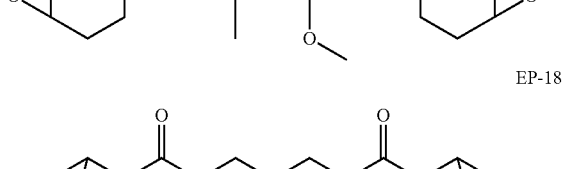

EP-19

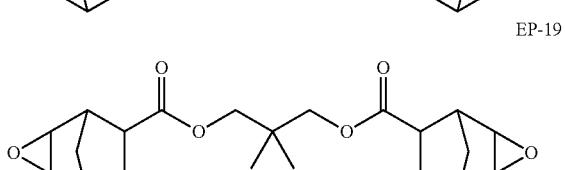

EP-20

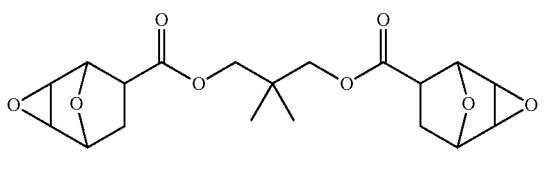

The added amount of an alicyclic epoxy compound is preferably 10-80 weight %. In the case of less than 10 weight %, the curing ability is badly varied depending on curing environment (temperature, humidity) to make the composition unusable. While, in the case of over 80 weight %, film physical properties become weak making the composition unusable. One type of an alicyclic epoxy compound may be utilized alone; however, not less than two types may be utilized in appropriate combination.

Further, these alicyclic epoxy compounds, although the manufacturing method is not specifically limited, can be synthesized referring to, for example, the forth edition, Experimental Chemistry Course 20, Organic Synthesis II, p. 213-, published by Maruzen K K Syuppan (1992); "The Chemistry of Heterocyclic Compounds-Small Ring Heterocycles part 3, Oxiranes", edited by Alfred Hasfner, John & Willey and Sons, An Interscience Publication, New York (1985); Yoshimura, Adhesion vol. 29, No. 12, p. 32 (1985), Yoshimura, Adhesion vol. 30, No. 5, p. 42 (1986), Yoshimura, Adhesion vol. 30, No. 7, p. 42 (1986), JP-A 11-100378, Japanese Patent Nos. 2,906, 245 and 2,926,262.

In an actinic ray curable composition of this invention, it is also preferable to incorporate epoxydated fatty acid ester or epoxidated fatty acid glyceride as an epoxy compound.

To incorporate epoxydated fatty acid ester or epoxidated fatty acid glyceride in combination with a system of oxetane compound/alicyclic epoxy compound, is preferable with respect to safety-environment such as. AMES and sensitizing, skin irritation and odor, as well as can solve conventional problems such as generation of wrinkles due to curing shrinkage and poor curing property and poor ejection behavior, which depend on curing environment (temperature, humidity).

As utilizable epoxidated fatty acid ester and epoxidated fatty acid glyceride, fatty acid ester and fatty acid glyceride, in which an epoxy group is introduced, can be employed without specific limitation.

Epoxidated fatty acid ester is those produced by epoxidation of oleic acid ester, and such as methyl epoxystearate, butyl epoxystearate and octyl epoxystearate are utilized. Further, epoxidated fatty acid glyceride is those produced by epoxidation of such as soybean oil, linseed oil and castor oil, and such as epoxidated soybean oil, epoxidated linseed oil and epoxidated castor oil are utilized.

(Onium Salt)

In this invention, a photo-polymerization initiator is preferably a photo-induced acid generator of an onium salt type which does not generate benzene by actinic ray irradiation. Specifically, preferable is at least one type of sulfonium salt represented by following formulas (31)-(34).

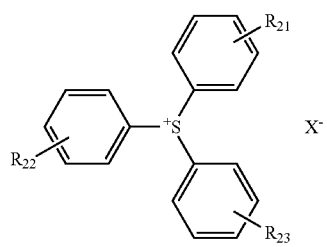

Formula (31)

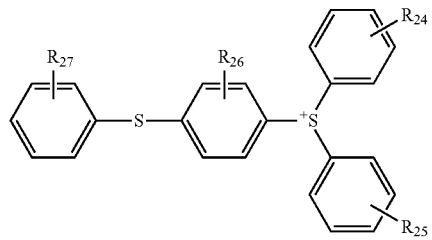

Formula (32)

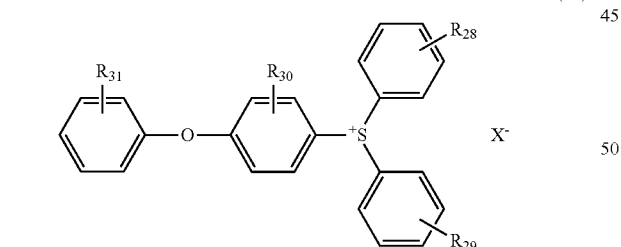

Formula (33)

Formula (34)

In the formulas, $R_{21}$-$R_{37}$ each are a hydrogen atom or a substituent. However, $R_{21}$-$R_{23}$ are never a hydrogen atom at the same time; $R_{24}$-$R_{27}$ are never a hydrogen atom at the same time; $R_{28}$-$R_{31}$ are never a hydrogen, atom at the same time; and $R_{32}$-$R_{37}$ are never a hydrogen atom at the same time. $X^-$ is a non-nucleophilic anionic residual group.

Further, a sulfonium salt selected from aforesaid Formulas (31)-(34), more specifically, is at least one type selected from Formulas (35)-(43).

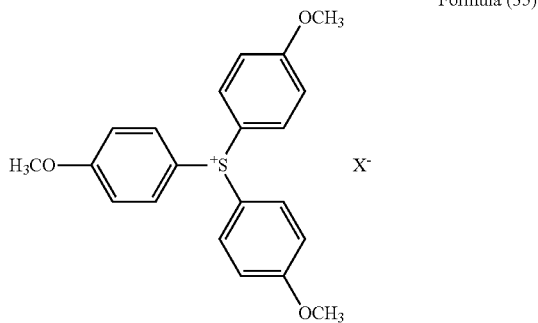

Formula (35)

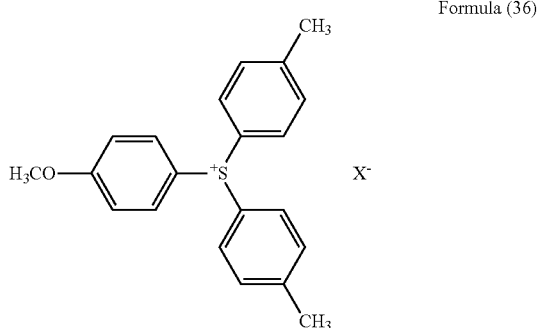

Formula (36)

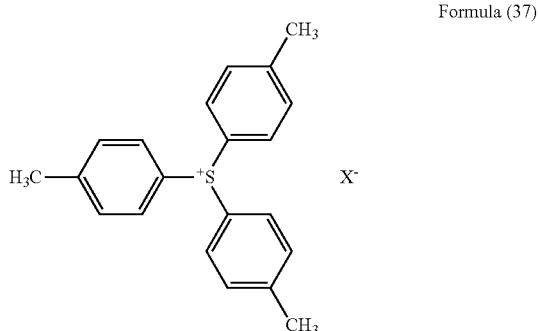

Formula (37)

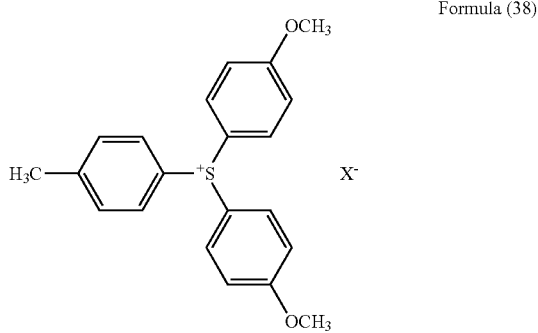

Formula (38)

Formula (39)

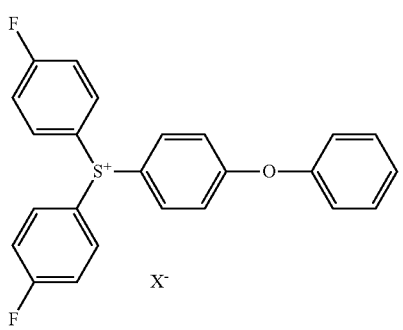

Formula (40)

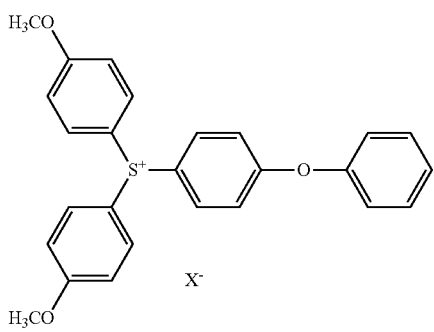

Formula (41)

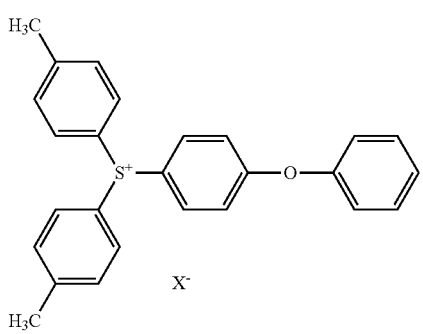

Formula (42)

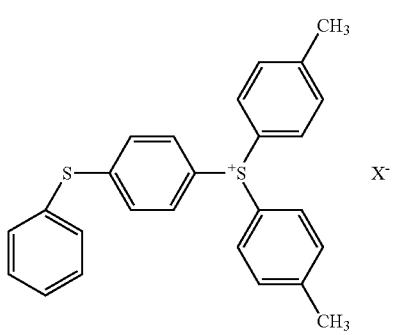

Formula (43)

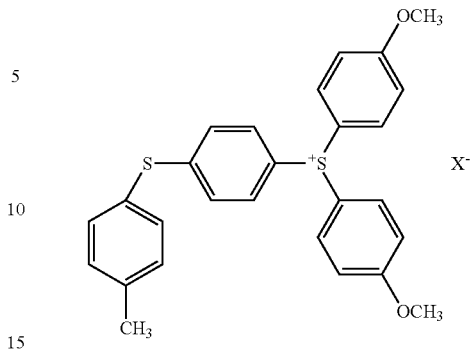

In the Formulas (35)-(43), $X^-$ is a non-nucleophilic anionic residual group.

"Not to generate benzene by actinic ray irradiation" in this invention means not to essentially generate benzene, and specifically indicates that the amount of benzene, which is generated when an image having approximately 100 m² with a thickness of 15 μm is printed by use of ink containing 5 weight % of onium salt (a photo-induced acid generator) in the ink composition and actinic rays as much as sufficiently decompose the photo-induced acid generator in a state of keeping the ink film surface at 30° C. are irradiated, is extremely small as not more than 5 μg or none. As said onium salt, sulfonium salt or iodonium salt is preferable, and those having Ea substituent on a benzene ring, which bonds to $S^+$ or $I^+$, satisfy the above condition. Said sulfonium salt is preferably a sulfonium salt compound represented by aforesaid formulas (31)-(34) and those having a substituent on a benzene ring which bonds to $S^+$ or $I^+$ satisfy the above condition.

A substituent represented by $R_{21}$-$R_{37}$ includes preferable an alkyl group such as a methyl, ethyl, propyl, i-propyl, butyl, i-butyl, t-butyl, pentyl and hexyl group; an alkoxy group such as a methoxy, ethoxy, propoxy, butoxy, hexyloxy, decyloxy and dodecyloxy group; an carbonyl group such as an acetoxy, propionyloxy, decylcarbonyloxy, dodecylcarbonyloxy, methoxycarbonyl, ethoxycarbonyl and benzoyloxy group; a phenylthio group, a halogen atom such as fluorine, chlorine, bromine and iodine; a cyano group, a nitro group, and a hydroxyl group.

A non-nucleophilic anionic residual group $X^-$ includes a halogen ion such as $F^-$, $Cl^-$, $Br^-$ and $I^-$; $B(C_6F_5)_4^-$, $R_{18}COO^-$, $R_{19}SO_3^-$, $SbF_6^-$, $AsF_6^-$, $PF_6^-$ and $BF_4^-$. However, $R_{38}$ and $R_{39}$ are each an alkyl group such as a methyl, ethyl, propyl and butyl group; a halogen atom such as fluorine, chlorine, bromine and iodine; and a nitro group, a cyano group, an alkyl group, which may be substituted by alkoxy group such as a methoxy and ethoxy group, or a phenyl group. Among these, $B(C_6F_5)_4^-$ and $PF_6^-$ are preferable with respect to safety.

The above-described compounds may be synthesized by a method well known in the art similarly to a photo-induced acid generator which is described in The Chemical Society of Japan Vol. 71, No. 11 (1998) or "Organic Materials for Imaging" edited by Study Group of Organic Electronics Materials, published by Bunshin Syuppan (1993).

In this invention, a sulfonium salt represented by Formulas (31)-(34) is specifically preferably at least one type of sulfonium salt selected from aforesaid Formulas (35)-(43). $X^-$ is a non-nucleophilic anionic residual group similar to those described before.

Exemplary compounds including an iodonium salt include the following compounds in addition to aforesaid Formulas (35)-(43) wherein $X^-$ is $PF_6^-$.
S-1
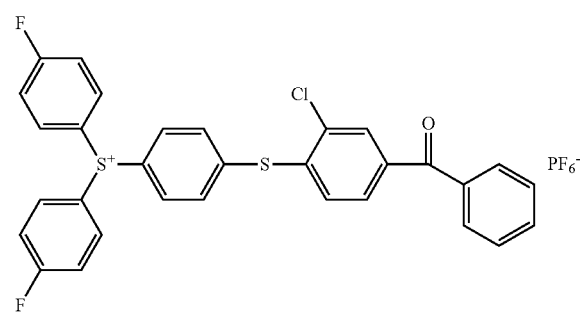
S-2
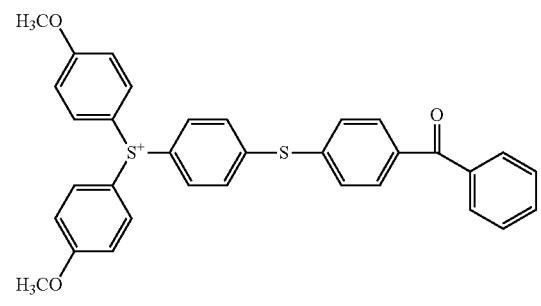
S-3
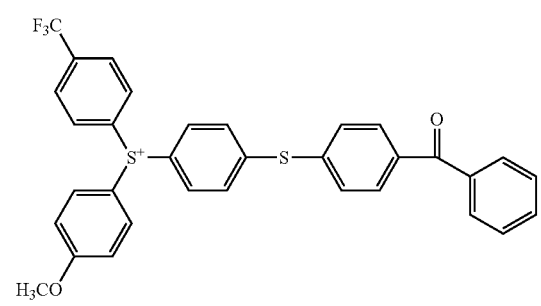
S-4
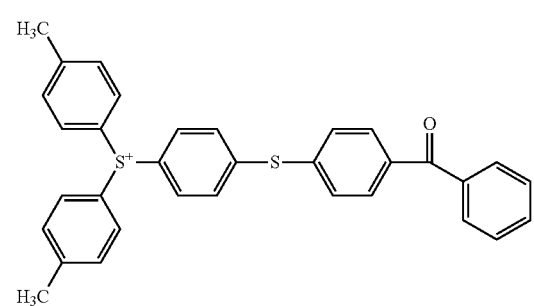
S-5
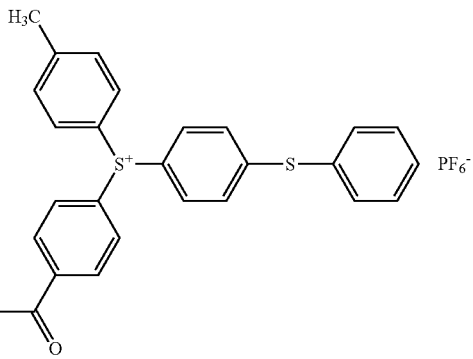
S-6
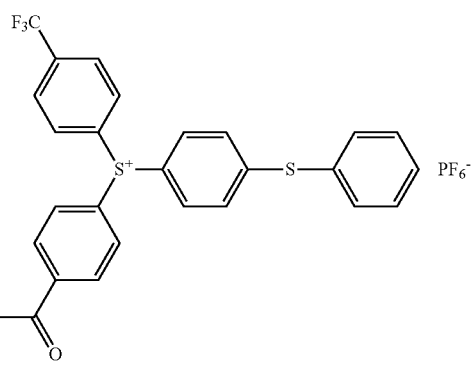
S-7
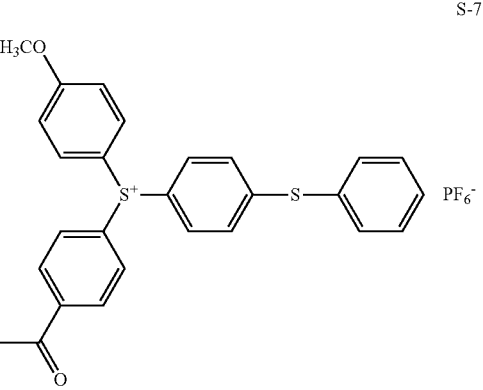
S-8
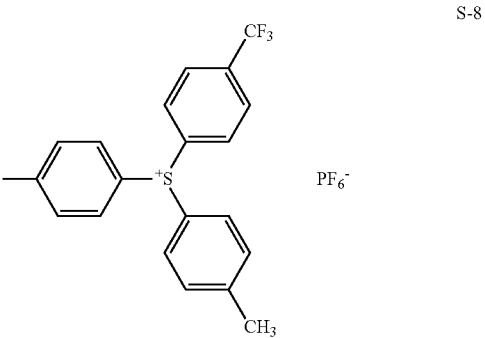

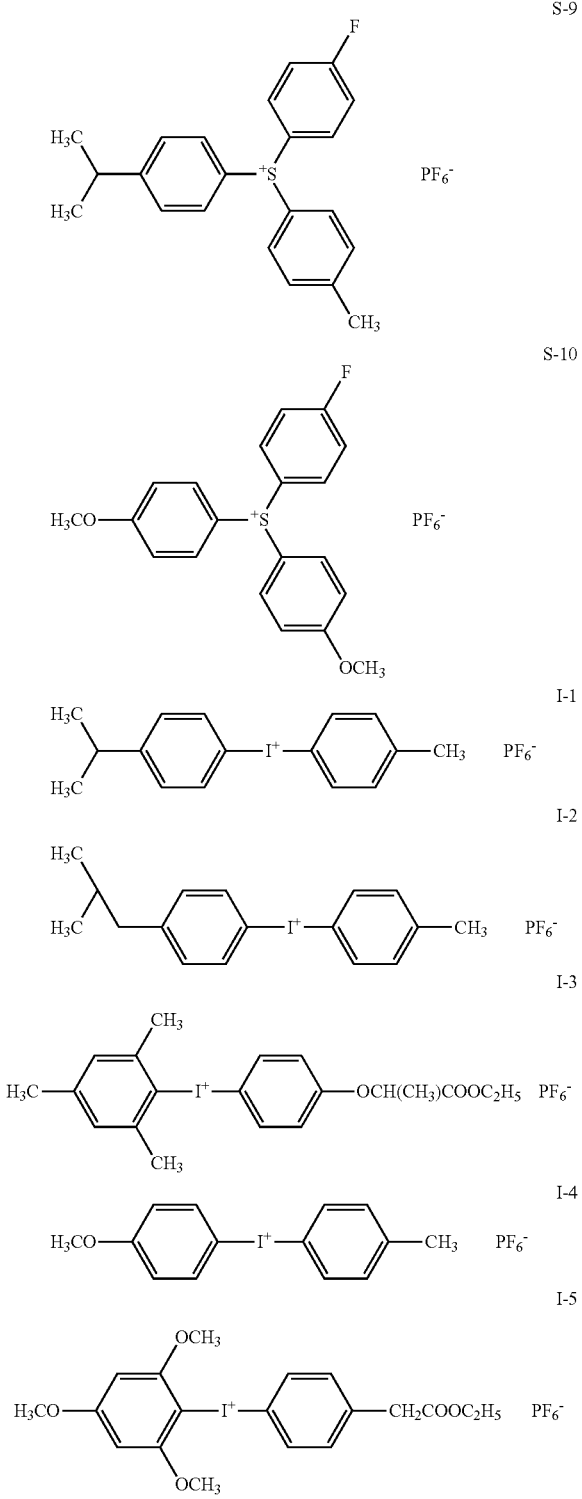

(Pigment)

Actinic ray curable ink-jet of this invention contains pigment as a colorant. Preferably utilized pigments will be listed below.

C. I. Pigment Yellow-1, 3, 12, 13, 14, 17, 42, 74, 81, 83, 87, 93, 95, 109, 120, 128, 138, 139, 151, 166, 180, and 185

C. I. Pigment Orange-16, 36, and 38

C. I. Pigment Red-5, 22, 38, 48:1, 48:2, 48:4, 49:1, 53:1, 57:1, 63:1, 101, 122, 144, 146, 177, and 185

C. I. Pigment Violet-19, and 23

C. I. Pigment Blue-15:1, 15:3, 15:4, 18, 60, 27, and 29

C. I. Pigment Green-7, and 36

C. I. Pigment White-6, 18, and 21

C. I. Pigment Black-7

For the purpose of dispersion of the above pigment, such as a ball mill, a sand mill, an atliter, a roll mill, an agitator, a Henschel mixer, a colloidal mill, an ultrasonic homogenizer, a pearl mill, a wet jet mill and a paint shaker can be utilized. A dispersion medium is preferably a photo-polymerizable compound, and monomer having the lowest viscosity among them is more preferably selected with respect to dispersion adaptability.

For dispersion of pigment, it is preferable to make the particle size of pigment particles of 0.08-0.5 μm, and selection of pigment, a dispersant and a dispersion medium, dispersion condition, and filtration condition are appropriately set so as to make the maximum particle size of 0.3-10 μm, and preferably 0.3-3 μm. By this particle size control, clogging of a head nozzle is depressed and storage stability, transparency and curing sensitivity of ink can be maintained.

In actinic ray curable ink-jet ink of this invention, the colorant concentration is preferably 1-10 weight % based on the total ink.

As a pigment dispersant, those having a basic anchor portion are preferably utilized, and a polymer dispersant having a comb form structure is more preferably utilized.

Specific examples of an utilizable pigment dispersant include such as Solsperse 9000, 17000, 18000, 19000, 20000, 24000SC, 24000DGR, 28000 and 32000, produced by Avecia Corp.; Ajisper PB821, and PB822, produced by Ajinomoto Fine Techno Co., Ltd.; PLAAD ED214, ED251, DISPARLON DA-325 and DA-234, produced by Kusumoto Chemicals Co., Ltd.; EFKA-5207, 5244, 6220 and 6225, produced by EFKA Corp. Further, in addition to a pigment dispersant, a pigment derivative (a synergist) may be incorporated; and specific examples of a pigment derivative include such as Solsperse 5000, 12000 and 22000, produced by Avecia Corp.; and EFKA-6746 and 6750, produced by EFKA Corp.

In an actinic ray curable composition of this invention, various types of additives other than those described above may be incorporated. For example, a surfactant, a leveling additive and a matting agent, polyester resin, polyurethane resin, vinyl type resin, acrylic resin, rubber type resin and waxes to adjust film physical properties, may be incorporated. Any aroma chemical or deodorant, well-known in the art, may be employed to minimize noxious odor released during radiation, typical examples of which are fragrances, such as rosemary oil, α-phenyl ethanol, furfural, heliotrope oil, and benzylpropionates, as well as various mixed perfumes, such as banana flavor, vanilla flavor, and mint flavor. Further, to improve storage stability, any basic compound well known in the art may be utilized, however, typically listed is a basic organic compound such as a basic alkali metal compound, a basic alkaline earth metal compound or amine. Further, it is possible to prepare a curable ink of a hybrid type, such as radical.cation.

A basic compound may also be incorporated. By incorporation of a basic compound, ejection stability is improved as well as reduced wrinkling due to curing shrinkage, which is inhibited even under low humidity. Any basic compound well known in the art can be utilized, however, typically listed is a basic organic compound such as a basic alkali metal compound, a basic alkaline earth metal compound and amine.

The above-described basic alkali metal compound includes hydroxide of alkali metal (such as lithium hydroxide, sodium hydroxide and potassium hydroxide), carbonate of alkali metal (such as lithium carbonate, sodium carbonate and potassium carbonate) and alcoholate of alkali metal (such as sodium methoxide, sodium ethoxide, potassium methoxide and potassium ethoxide). The above-described basic alkaline earth metal compound includes hydroxide of alkaline earth metal (such as magnesium hydroxide and calcium hydroxide), carbonate of alkaline earth metal (such as magnesium carbonate and calcium carbonate) and alcoholate of alkaline earth metal (such as magnesium methoxide).

A basic organic compound includes nitrogen containing heterocyclic compounds such as amine, quinoline and quinolidine, however, amine is preferred with respect to compatibility with photo-polymerizing monomer, which includes such as octylamine, naphthylamine, xylenediamine, benzylamine, diphenylamine, dibutylamine, dioctylamine, dimethylaniline, quinucridine, tributylamine, trioctylamine, tetramethylethylenediamine, tetramethyl-1,6-hexamethylenediamine, hexatetramine and triethanolamine.

The concentration of a basic compound incorporated is in a range of preferably 10-1,000 weight ppm and specifically preferably of 20-500 weight ppm, against the total photo-polymerizing monomer. Herein, a basic compound may be utilized alone or in combination of plural types.

In actinic ray curable ink-jet ink of this invention, an actinic ray curable composition preferably has a viscosity at 25° C. of 7-40 mPa·s with respect to achieving stable ejection behavior and an excellent curing property regardless of curing environment (temperature, humidity).

(Recording Medium)

As a recording medium utilized in this invention, various types of non-absorptive plastics and film thereof, which are utilized for so-called soft packaging, can be utilized in addition to ordinary non-coated paper and coated paper; and as various types of plastic film, for example PET (polyethylene terephthalate) film, OPS (oriented polystyrene) film, OPP (oriented polypropylene) film, ONy (oriented nylon) film, PVC (polyvinylidene chloride) film, PE (polyethylene) film and TAC (triacetatyl cellulose) film may be listed. As other plastics, polycarbonate, acrylic resin, ABS (acryl.butene.styrene) resin, polyacetal, PVA (polyvinyl alcohol) and rubbers may be utilized. Further, metals and glasses are applicable. It is preferred to utilize a long length (web form) recording medium with respect to a cost of a recording medium such as a packaging cost and a manufacturing cost; manufacturing efficiency of a printed matter, and adaptability to various sizes of a printed matter.

Next, an image forming method of this invention will be explained.

(Image Forming Method)

As an image forming method of this invention, preferable is a method to eject and draw the above-described ink on a recording medium by means of ink-jet method and to successively cure the ink by irradiation of actinic rays such as ultraviolet rays.

(Total Ink Layer Thickness After Ink Landing)

In this invention, the total ink layer thickness after ink has landed on a recording medium and cured by irradiation of actinic rays is preferably 2-25 μm. It is a present state that the total ink layer thickness is over 25 μm in an actinic ray curable ink-jet recording of a screen printing field, however, in a soft package printing field which mostly employs a plastic material as a recording medium, since there is problems of change of stiffness and sensation in quality of the whole printed matter in addition to curl and wrinkling of the aforesaid recording medium, ink ejection of an excess layer thickness is not preferable. Herein, "the total ink layer thickness" means the maximum value of an ink layer thickness drawn on a recording medium, and means the same with any case of recording by an ink-jet method of single-color, two-color accumulation, three-color accumulation or four-color accumulation (white ink base).

(Ejection Condition of Ink)

As an ink ejection condition, it is preferable to eject ink while heating a recording medium and ink at 35-100° C. with respect to ejection stability. It is necessary to keep constant temperature while raising ink temperature because actinic ray curable ink-jet ink shows viscosity variation due to temperature variation, and the viscosity variation, in turn, will significantly affect a size and an ejection speed of the liquid drops resulting in deterioration of an image quality. The control range of ink temperature is a set temperature±5° C., preferably a set temperature±2° C. and more preferably a set temperature±1° C. Further, in this invention, a liquid quantity ejected from each nozzle is preferably 2-15 pl.

(Light Irradiation Condition After Ink Landing)

In an image forming method of this invention, as an actinic ray irradiation condition, it is preferable to irradiate actinic rays in 0.001-1 second after ink landing and more preferably in 0.001-0.5 seconds. It is specifically important that the irradiation timing is as early as possible.

The above light irradiation may be either visible light irradiation or ultraviolet irradiation, and ultraviolet irradiation is specifically preferred. In the case of performing ultraviolet irradiation, the amount of ultraviolet irradiation is in a range not less than 100 mJ/cm$^2$ and preferably not less than 500 mJ/cm$^2$, and further, of not more than 10,000 mJ/cm$^2$ and more preferably not more than 5,000 mJ/cm$^2$. In such a range of ultraviolet irradiation amount, it is advantageous because a curing reaction can be sufficiently performed and discoloration of a colorant by ultraviolet irradiation can be prevented. Ultraviolet irradiation can be performed by use of such as a metal halide lamp, a Xenon lamp, a carbon arc lamp, a chemical lamp, a low pressure mercury lamp and a high pressure mercury lamp. For example, such as H lamp, D lamp and V-lamp, manufactured by Fusion System Corp., which are available on the market can be utilized.

A metal halide lamp has a more continuous spectrum compared to a high pressure mercury lamp (the primary wavelength is 365 nm), exhibiting a high emission efficiency in a range of 200-450 nm, and is rich with a long wavelength region. Therefore, metal halide lamp is preferred in the case of utilizing pigment as an actinic ray curable composition of this invention.

As an irradiation method of actinic rays, a basic method thereof is disclosed in JP-A 60-132767. According to this, a light source is provided on the both sides of a head unit and the head and the light source are scanned in a shuttle mode. Irradiation is performed leaving a certain time after ink landing. Further, curing is completed by another light source without drive. In U.S. Pat. No. 6,145,979, disclosed are an irradiation method to utilize optical fiber, and a method in which a collimated light source is incident on a mirror arranged on the unit side plane and UV light is irradiated on the recording portion. In this invention, any one of these irradiation method can be employed.

Further, it is also one of preferable embodiments that actinic ray irradiation is divided into two steps; actinic rays are firstly irradiated by the aforesaid method in 0.001-2 seconds after ink landing and actinic rays are further irradiated after finishing the whole printing. By dividing actinic ray irradiation into two steps, it is possible to depress shrinkage of a recording medium caused at ink curing.

Heretofore, in a UV ink-jet method, it has been general to utilize a light source having an illuminance as high as over 1 kW·hr based on the total power consumption of the light source to inhibit broadening and bleeding of a dot after ink landing. However, in the case of utilizing these light sources, particularly in printing on such as a shrink label, shrinkage of a recording medium is extremely large resulting in making said light sources unusable.

In this invention, it is preferable to utilize actinic rays having the highest illuminance in a wavelength region of 254 nm, and thereby it is possible to form a highly precise image and to limit shrinkage of a recording medium within a practically allowable level, even with a light source the total power consumption of which is over 1 kW·hr. Further, the total power consumption of a light source to irradiate actinic rays is preferably less than 1 kW·hr. A light source having the total power consumption less than 1 kW·hr includes a fluorescent lamp, a cold cathode tube, a hot cathode tube and an LED, however, is not limited thereto.

(Ink-Jet Recording Apparatus)

Next, an ink-jet recording apparatus (hereinafter simply referred to as a recorder) of this invention will be explained appropriately referring to drawings. Herein, a recorder of the drawings is only one embodiment of this invention and a recorder of this invention is not limited to these drawings.

FIG. 1 is a front view to show a constitution of the primary portion of a recorder of this invention. Recording apparatus 1 is constituted of such as head carriage 2, recording head 3, irradiation means 4 and platen portion 5. In this recording apparatus 1, platen portion 5 is arranged under recording medium P. Platen portion 5 is provided with a function to absorb ultraviolet rays and absorbs excess ultraviolet rays having passed through recording medium P. As a result, an image having a high precision can be very stably reproduced.

Recording medium P is guided by guide member 6 to be transferred from this side to the interior of FIG. 1 by operation of a transfer means (not shown in the drawing). A head scanning means (not shown in the drawing) scans recording head 3 held by head carriage 2 by shifting head carriage 2 back and forth along the Y direction in FIG. 1.

Head carriage 2 is arranged over recording medium P to store a plural number of recording head 3, which will be described later, corresponding to the number of colors utilized for image printing on recording medium P while arranging the ejection outlet downward. Head carriage 2 is arranged in a form of freely shiftable back and forth against the main body of recording apparatus 1, and is shifted back and forth along the Y direction of FIG. 1 by drive of a head scanning means.

Herein, in FIG. 1, head carriage 2 is drawn so as to store recording head 3 of yellow (Y), magenta (M), cyan (C), black (K), light yellow (Ly), light magenta (Lm), light cyan (Lc), light black (Lb), and white (W) in practical use, a number of colors of recording head 3 to be stored in head carriage 2 can be appropriately determined.

Recording head 3 ejects actinic ray curable ink-jet ink (for example, UV curable ink), which has been supplied from an ink supply means (not shown in the drawing) toward recording medium P through an ejection outlet by operation of an ejection means (not shown in the drawing), a plural number of which are stored in the recording head. UV ink ejected from recording head 3 is comprised of such as a colorant, polymerizing monomer and an initiator, and provided with a capability of curing by cross-linking or polymerization of the monomer accompanied with catalytic action of the initiator by receiving irradiation of ultraviolet rays.

Recording head 3 ejects UV curable ink as ink drops on a predetermined region (a region capable of being landed) to land ink drops on said region capable of being landed during a scan of being shifted from one end of recording medium P to the other end of recording medium P along the Y direction in FIG. 1 by drive of a head scanning means.

After the above-described scan is performed appropriate times to eject UV curable ink toward one of a region capable of being landed, recording medium P is shifted from this side to the interior direction of FIG. 1 by a shifting means and UV ink is ejected toward the next region capable of being landed adjacent along the interior direction of FIG. 1 against the above-described region capable of being landed by recording head 3 while performing a scan by a shifting head scanning means again.

By repeating the above-described operations to eject UV curable ink from recording head 3 by a head scanning means and a transfer means in combination, an image is formed on recording medium P.

Irradiation means 4 is constituted of an ultraviolet lamp, which emits ultraviolet rays of a specific wavelength region at stable exposure energy, and a filter, which transmits ultraviolet rays of a specific wavelength region. Herein, as an ultraviolet lamp, such as a mercury lamp, a metal halide lamp, an excimer laser, an ultraviolet laser, a cold cathode tube, a hot cathode tube, a black light and a LED (Light Emitting Diode) are applicable, and a cold cathode tube, a hot cathode tube, a mercury lamp or a black light, of a band form, is preferable. Specifically, a low pressure mercury lamp, a hot cathode tube, a cold cathode tube and a sterilizing lamp, which emit ultraviolet rays of a wavelength 254 nm, are preferred because prevention of bleeding and control of a dot diameter can be efficiently performed. By employing a black light as a radiation source of irradiation means 4, irradiation means 4 to cure UV curable ink can be prepared at a low cost.

Irradiation means 4 is provided with a form approximately same as the maximum one of the region which can be set by recording apparatus 1, or larger than a region capable of being landed, among a region capable of being landed by UV curable ink ejected by recording head 3 in one time scan by drive of a head scanning means.

Irradiation means 4 is arranged by being fixed in nearly parallel to recording medium P on the both sides of head carriage 2.

As described before, as a means to adjust illuminance at an ink ejection portion, the whole of recording head 3 is naturally light shielded; in addition to this, it is effective to set distance h2 between ink ejection portion 31 of recording head 3 and recording medium P larger than distance h1 between irradiation means 4 and recording medium P (h1<h2), or to make distance d between recording head and irradiation means 4 remote (make d large). Further, it is more preferable to provide bellows structure 7 between recording head 3 and irradiation means 4.

Herein, the wavelength irradiated by irradiation means 4 can be appropriately varied by changing an ultraviolet lamp or a filter which are arranged in irradiation means 4.

Actinic ray curable ink-jet ink of this invention is also possible to form an image by use of a line head type recording apparatus.

Figure 2:
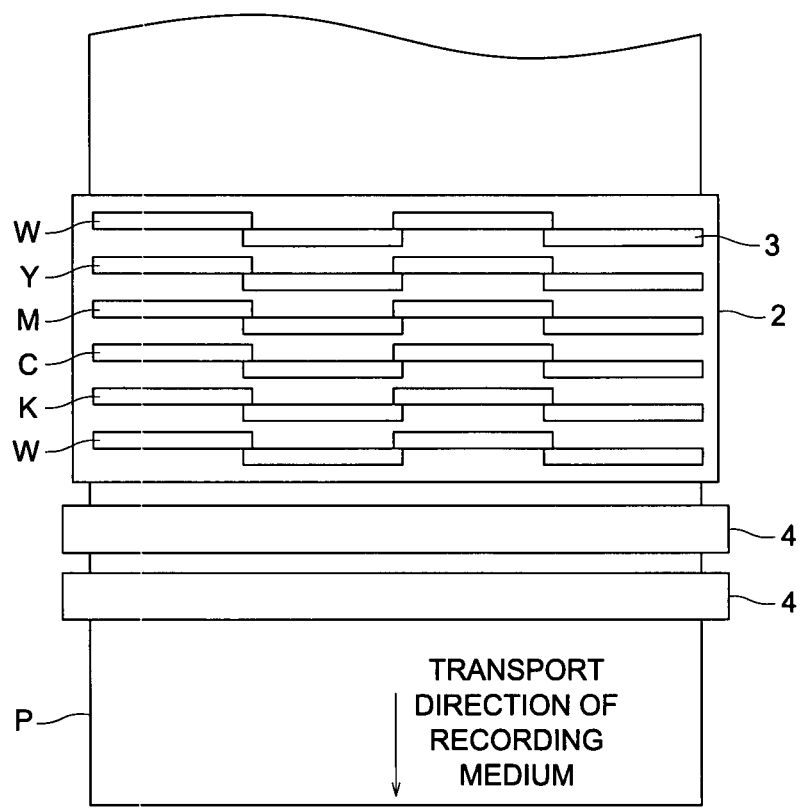
FIG. 2 is a front view showing another example of the primary constitution of an ink-jet recording apparatus of this invention.

FIG. 2 is an over plane view to show an example of the primary constitution of an ink-jet recording apparatus.

An ink-jet recording apparatus shown in FIG. 2 is called a line head type, a plural number of ink-jet recording head 3 of each color is fixing arranged so as to cover the whole width of recording medium P.

On the other hand, on the down stream of head carriage 2, irradiation means 4 is arranged similarly so as to cover the whole width of recording medium P and to cover the whole ink printing region. As an ultraviolet lamp utilized for irradiation means 4, similar one to those described in FIG. 1 can be employed.

In this line head type, head carriage 2 and irradiation means 4 are fixed, and only recording medium P is transferred to form an image by ink ejection and curing. Herein, recording medium P is preferably heated at 35-60° C.

EXAMPLES

In the following, this invention will be specifically explained referring to examples, however, an embodiment of this invention is not limited thereto. Herein, including description such as in Tables, "%" in examples is "weight %" and "part(s)" is "weight part(s)", unless otherwise mentioned.

Example 1

(Preparation of Actinic Ray Curable Composition)

A photo-polymerizable compound, a photo-polymerization initiator, a silicone surfactant, a basic compound and the following pigment were added as shown in Table 1 to be dissolved, whereby actinic ray curable compositions (1-20) were prepared.

(Pigment)

Crude copper phthalocyanine (Copper phthalocyanine: produced by Toyo Ink Mfg. Co., Ltd.) of 250 parts, 2,500 parts of sodium chloride and 500 parts of polyethylene glycol (polyethylene glycol 300: produced by Tokyo Chemical Industry Co., Ltd.) were charged in a 1 gallon kneader made of stainless (produced by Inoue Manufacturing Co., Ltd.) and mixing kneaded for 3 hours. Next, after the mixture had been poured into 2.5 liter of hot water to be stirred by a high speed mixer for approximately 1 hour to make a slurry state, filtration and washing with water were repeated 5 times to eliminate sodium chloride and a solvent. Successively, the resulting mixture was dried by means of spray drying to prepare processed pigment.

TABLE 1

| Curable composition No. | | Photo-polymerizable compound | | Photo-polymerization initiator | Basic compound | Silicone surfactant | Others |
|---|---|---|---|---|---|---|---|
| | | Oxetane | Epoxy compound | | | | |
| 1 (Comparison) | *1 | OXT221 | OXT101 | 2021P | UVI6992 | TIPA | BYK-302 | Pigment |
| | *2 | 50 | 10 | 29.45 | 5 | 0.5 | 0.05 | 5 |
| 2 (Comparison) | *1 | OXT221 | OXT101 | 2021P | S-5 | TIPA | BYK-302 | Pigment |
| | *2 | 50 | 10 | 29.45 | 5 | 0.5 | 0.05 | 5 |
| 3 (Invention) | *1 | OXT221 | OXT101 | 2021P | S-5 | TIPA | KF6004 | Pigment |
| | *2 | 50 | 10 | 29.45 | 5 | 0.5 | 0.05 | 5 |
| 4 (Invention) | *1 | OXT221 | OXT101 | 2021P | S-5 | TIPA | X-22-4272 | Pigment |
| | *2 | 50 | 10 | 29.45 | 5 | 0.5 | 0.05 | 5 |
| 5 (Invention) | *1 | OXT221 | OXT101 | 2021P | S-5 | TIPA | X-22-6266 | Pigment |
| | *2 | 50 | 10 | 29.45 | 5 | 0.5 | 0.05 | 5 |
| 6 (Comparison) | *1 | OXT221 | OXT101 | Vf7010 | S-2 | TIPA | BYK-302 | Pigment |
| | *2 | 50 | 10 | 29.3 | 5 | 0.5 | 0.2 | 5 |
| 7 (Invention) | *1 | OXT221 | OXT101 | Vf7010 | S-2 | TIPA | X-22-4272 | Pigment |
| | *2 | 50 | 10 | 29.3 | 5 | 0.5 | 0.2 | 5 |
| 8 (Invention) | *1 | OXT221 | OXT101 | Vf7010 | S-2 | TIPA | X-22-6266 | Pigment |
| | *2 | 50 | 10 | 29.3 | 5 | 0.5 | 0.2 | 5 |
| 9 (Comparison) | *1 | OXT221 | OXT101 | EP-1 | UVI6992 | TBA | BYK-302 | Pigment |
| | *2 | 50 | 10 | 29.3 | 5 | 0.5 | 0.2 | 5 |
| 10 (Invention) | *1 | OXT221 | OXT101 | EP-1 | I-3 | TBA | KF6004 | Pigment |
| | *2 | 50 | 10 | 29.3 | 5 | 0.5 | 0.2 | 5 |
| 11 (Comparison) | *1 | OXT221 | OXT101 | EP-1 | I-3 | TBA | KF351 | Pigment |
| | *2 | 50 | 10 | 29.3 | 5 | 0.5 | 0.2 | 5 |
| 12 (Comparison) | *1 | OXT221 | OXT101 | EP-1 | I-3 | TBA | KF354L | Pigment |
| | *2 | 50 | 10 | 29.3 | 5 | 0.5 | 0.2 | 5 |
| 13 (Invention) | *1 | OXT221 | OXT101 | EP-1 | I-3 | TBA | X-22-4272 | Pigment |
| | *2 | 50 | 10 | 29.3 | 5 | 0.5 | 0.2 | 5 |
| 14 (Invention) | *1 | OXT221 | OXT101 | EP-8 | PF6 salt of formula (40) | TBA | X-22-4272 | Pigment |
| | *2 | 50 | 10 | 29.4 | 5 | 0.5 | 0.1 | 5 |
| 15 (Invention) | *1 | OXT221 | OXT101 | EP-15 | PF6 salt of formula (40) | TBA | X-22-6266 | Pigment |
| | *2 | 50 | 10 | 29.4 | 5 | 0.5 | 0.1 | 5 |
| 16 (Comparison) | *1 | OXT221 | OXT101 | EP-15 | PF6 salt of formula (40) | TBA | BYK-302 | Pigment |
| | *2 | 50 | 10 | 29.4 | 5 | 0.5 | 0.1 | 5 |
| 17 (Comparison) | *1 | *1 | OXT101 | EP-8 | PF6 salt of formula (43) | TIPA | BYK-302 | Pigment |
| | *2 | 50 | 10 | 29.3 | 5 | 0.5 | 0.2 | 5 |
| 18 (Invention) | *1 | *1 | OXT101 | EP-8 | PF6 salt of formula (43) | TIPA | KF6004 | Pigment |
| | *2 | 50 | 10 | 29.3 | 5 | 0.5 | 0.2 | 5 |
| 19 (Invention) | *1 | *1 | OXT101 | EP-8 | PF6 salt of formula (43) | TIPA | X-22-4272 | Pigment |
| | *2 | 50 | 10 | 29.3 | 5 | 0.5 | 0.2 | 5 |

TABLE 1-continued

| Curable composition No. | | Oxetane | Photo-polymerizable compound Epoxy compound | Photo-polymerization initiator | Basic compound | Silicone surfactant | Others |
|---|---|---|---|---|---|---|---|
| 20 (Invention) | *1 *1 | OXT101 | EP-8 | PE6 salt of formula (43) | TIPA | X-22-6266 | Pigment |
| | *2 50 | 10 | 29.3 | 5 | 0.5 | 0.2 | 5 |

*1: Compound name,
*2: Added amount (%),

Each compound and expressions described in Table 1 are as follows.

*1: 2-Methoxy-3,3-dimethyloxetane
OXT221: Di[1-ethyl(3-oxetanyl)]methyl ether (produced by Toa Gosei Co., Ltd.)
OXT101: 3-Ethyl-3-hydroxymethyl oxetane (produced by Toa Gosei Co., Ltd.)
2021P: Celloxide 2021P (produced by Daicel Chemical Industries Ltd.)
Vf7010: Vikoflex 7010 (produced by Atofina Corp.)
UVI6992: Propione carbonate 50% solution (produced by Daw Chemicals Corp.)
TIPA: Tri-i-propanolamine
TBA: Tributylamine Herein, silicone surfactant is those described in following Table 2.

TABLE 2

| Name | Brand name | HLB | Structure | Manufacturer |
|---|---|---|---|---|
| SA-1 | KF6004 | 23 | Terminal polyether | Shin-Etsu Chemical Co., Ltd. |
| SA-2 | KF351 | 16 | Side-chain polyether | Shin-Etsu Chemical Co., Ltd. |
| SA-3 | X-22-4272 | 14 | Terminal polyether | Shin-Etsu Chemical Co., Ltd. |
| SA-4 | X-22-6266 | 19 | Terminal polyether | Shin-Etsu Chemical Co., Ltd. |
| SA-5 | KF354L | 20 | Side-chain polyether | Shin-Etsu Chemical Co., Ltd. |
| SA-6 | BYK-302 | 11 | Side-chain polyether | BYK Chemie |

(Performance Evaluation)

The following performance were evaluated with respect to prepared actinic ray curable compositions.

<Curing Sensitivity>

After each composition was coated on synthetic paper (Synthetic Paper Yupo FGS: produced by Yupo Corporation) so as to make a layer thickness of 3 μm, ultraviolet rays were irradiated while varying the ultraviolet light quantity, and after irradiation, the coated and cured layer was scratched with a nail to determine an irradiation energy (mJ/cm$^2$), at which the film is peeled off, to be a curing sensitivity.

<Abrasion Resistance>

After each composition was coated on synthetic paper (Synthetic Paper Yupo FGS: described above) so as to make a layer thickness of 80 μm, a light quantity of 180 mW/cm$^2$ was irradiated by use of a hot cathode tube (a specially ordered product: produced by Nippo Co., Ltd.) 200 W source to prepare a cured product. With respect to this cured product, abrasion resistance was evaluated according to the following criteria.

5: No scratch was observed even with strong scrub.
4: Some scratches were observed with strong scrub, however, it was at the highest level to be usable in practice.
3: Some scratches were observed with strong scrub, however, it was at the lowest level to be usable in practice.
2: Some scratches were observed with strong scrub, and it was unallowable in practice.
1: Some scratches were observed even with weak scrub.

<Preparation of Actinic Ray Curable Ink-Jet Ink>

The aforesaid each photo-polymerizing composition was charged in a stainless beaker and stirred and mixed over 1 hour on a hot plate of 65° C. to be dissolved. Next, the above-described pigment together with 200 g of zirconia beads having a diameter of 1 mm were added into this solution to be sealed and a dispersion treatment was performed for 2 hours by use of a paint shaker. Then, after zirconia beads having been removed, a combination of each photo-polymerization initiator, basic compound and silicone surfactant shown in Table 1 was added, and the resulting composition was filtered through a membrane filter of 0.8 μm precision to prevent printer clogging, whereby actinic ray curable inks (hereinafter, referred to simply as ink-jet inks or inks) 1-20 were prepared.

<Image Formation by Ink-Jet>

On an ink-jet recorder having a constitution described in FIG. 1 which is equipped with a piezo type ink-jet nozzle (made of metal), each ink set prepared above was mounted and the following image recording was continuously performed on a long length recording medium (Yupo FGS: synthetic paper produced by Yupo Corporation) having a width of 600 mm and a length of 20 m.

Ink supply system is constituted of an ink tank, a supply tube, a pre-room ink tank, a piping with a filter and a piezo head, and a portion from the pre-room tank to the head was heat-insulated and heated at 50° C. Herein, the head portion was heated corresponding to a viscosity of each actinic ray curable ink-jet ink and driven so as to eject multi-size dot: of a liquid drop quantity of 2-15 pl at a resolution of 720×720 dpi, whereby the above-described ink-jet ink was continuously ejected. Further, a recording medium was heated at 40° C. by a plane heater. Ink-jet ink, after landing, was irradiated with a light quantity of 180 mW/cm$^2$ and cured in a moment (less than 0.5 seconds after landing), by use of hot cathode tubes (specially ordered product manufactured by Nippo Co., Ltd.) on the both sides of a carriage. The total ink layer thickness measured after image recording was in a range of 2-60 μm.

Herein, illuminance of each irradiation light source was measured by use of UVPF-A1 produced by Iwasaki Electric Co., Ltd. as accumulated illuminance.

<Stains>

A non-image area of printed image after 10 minutes of ejection period was observed while being magnified with a loupe to determine whether dirt of ink is present, whereby evaluation of dirt was carried out based on the following criteria.

A: No stain was recognized.

B: Slight stain was recognized, however, it was not a problematic level in practical use.

C: Some stain, which was a problematic level in practical use, was partly recognized.

D: Stain was recognized in almost all the surface, and it was a problematic level in practical use.

The results obtained above will be shown all together in Table 3.

TABLE 3

| Sample | Abrasion resistance | Curing sensitivity (mJ/cm$^2$) | Stain |
|---|---|---|---|
| 1 (Comparison) | 2 | 100 | C |
| 2 (Comparison) | 2 | 100 | C |
| 3 (Invention) | 5 | 65 | A |
| 4 (Invention) | 5 | 65 | A |
| 5 (Invention) | 5 | 65 | A |
| 6 (Comparison) | 1 | 200 | D |
| 7 (Invention) | 5 | 100 | A |
| 8 (Invention) | 5 | 100 | A |
| 9 (Comparison) | 2 | 100 | C |
| 10 (Invention) | 5 | 65 | A |
| 11 (Comparison) | 2 | 100 | D |
| 12 (Comparison) | 2 | 100 | D |
| 13 (Invention) | 5 | 65 | A |
| 14 (Invention) | 5 | 65 | A |
| 15 (Invention) | 5 | 65 | A |
| 16 (Comparison) | 2 | 100 | D |
| 17 (Comparison) | 2 | 100 | C |
| 18 (Invention) | 5 | 65 | A |
| 19 (Invention) | 5 | 65 | A |
| 20 (Invention) | 5 | 65 | A |

It has been proved from Table 3 that samples of this invention exhibit no sensitivity decrease as well as improved cured layer strength without stain.

Example 2

<Preparation of Actinic Ray Curable Ink-Jet Ink Set>

Dispersant (PB822: produced by Ajinomoto Fine-Techno Co., Inc.) and each photo-polymerizable compound described in Table 4 were charged in a stainless beaker and stirred and mixed to be dissolved over 1 hour while being heated on a hot plate at 65° C. Next, this solution, after having been added with the following each pigment, poured into a polyethylene bottle together with 200 g of zirconia beads having a diameter of 1 mm to be sealed and subjected to a dispersion treatment for 2 hours. Then, zirconia beads being removed from the system, to which each combination of such as a photo-polymerizable compound, a basic compound and a silicone surfactant was added, and the composition was filtered through a membrane filter of 0.8 μm precision, whereby actinic ray curable ink sets (also referred to as ink sets) 21-36 were prepared.

TABLE 4

| Ink set No. | | Photo-polymerizable compound | | | | | Photo-polymerization initiator | Basic compound |
|---|---|---|---|---|---|---|---|---|
| | | Oxetane | | | Epoxy compound | | | |
| 21 (Comparison) | *1 | OXT221 | OXT101 | OXT212 | 2021P | Vf7010 | UVI6992 | TBA |
| | *2 | 50 | 3 | 7 | 23.6 | 5 | 5 | 1 |
| 22 (Invention) | *1 | OXT221 | OXT101 | OXT212 | 2021P | Vf7010 | UVI6992 | TBA |
| | *2 | 50 | 3 | 7 | 23.6 | 5 | 5 | 1 |
| 23 (Invention) | *1 | OXT221 | OXT101 | OXT212 | 2021P | Vf7010 | UVI6992 | TBA |
| | *2 | 50 | 3 | 7 | 23.6 | 5 | 5 | 1 |
| 24 (Invention) | *1 | OXT221 | OXT101 | OXT212 | 2021P | Vf7010 | S-5 | TBA |
| | *2 | 50 | 3 | 7 | 23.6 | 5 | 5 | 1 |
| 25 (Comparison) | *1 | OXT221 | OXT101 | OXT212 | Vf7010 | — | S-7 | TIPA |
| | *2 | 50 | 3 | 7 | 28.5 | — | 5 | 1 |
| 26 (Invention) | *1 | OXT221 | OXT101 | OXT212 | Vf7010 | — | S-7 | TIPA |
| | *2 | 50 | 3 | 7 | 28.5 | — | 5 | 1 |
| 27 (Invention) | *1 | OXT221 | OXT101 | OXT212 | Vf7010 | — | S-7 | TIPA |
| | *2 | 50 | 3 | 7 | 28.5 | — | 5 | 1 |
| 28 (Comparison) | *1 | OXT221 | OXT101 | OXT212 | EP-1 | Vf7010 | I-3 | TBA |
| | *2 | 50 | 3 | 7 | 23.5 | 5 | 5 | 1 |
| 29 (Invention) | *1 | OXT221 | OXT101 | OXT212 | EP-1 | Vf7010 | I-3 | TBA |
| | *2 | 50 | 3 | 7 | 23.5 | 5 | 5 | 1 |
| 30 (Comparison) | *1 | OXT221 | OXT101 | OXT212 | EP-1 | Vf7010 | I-3 | TBA |
| | *2 | 50 | 3 | 7 | 23.5 | 5 | 5 | 1 |
| 31 (Comparison) | *1 | OXT221 | OXT101 | OXT212 | EP-1 | Vf7010 | I-3 | TBA |
| | *2 | 50 | 3 | 7 | 23.5 | 5 | 5 | 1 |
| 32 (Invention) | *1 | OXT221 | OXT101 | OXT212 | EP-1 | Vf7010 | I-3 | TBA |
| | *2 | 50 | 3 | 7 | 23.5 | 5 | 5 | 1 |
| 33 (Comparison) | *1 | *1 | OXT101 | OXT212 | EP-8 | Vf7010 | *3 | TIPA |
| | *2 | 50 | 3 | 7 | 22.7 | 5 | 5 | 1 |
| 34 (Invention) | *1 | *1 | OXT101 | OXT212 | EP-8 | Vf7010 | *3 | TIPA |
| | *2 | 50 | 3 | 7 | 22.7 | 5 | 5 | 1 |
| 35 (Invention) | *1 | *1 | OXT101 | OXT212 | EP-8 | Vf7010 | *3 | TIPA |
| | *2 | 50 | 3 | 7 | 22.7 | 5 | 5 | 1 |

TABLE 4-continued

| | | | | | | | | |
|---|---|---|---|---|---|---|---|---|
| 36 (Invention) | *1 *2 | *1 50 | OXT101 3 | OXT212 7 | EP-8 22.7 | Vf7010 5 | *3 5 | TIPA 1 |

| Ink set No. | Silicone surfactant | Fragrance | Dispersant | Pigment | Others | |
|---|---|---|---|---|---|---|
| 21 (Comparison) | BYK-302 0.1 | Linalool 0.1 | PB822 1 | *4 3 | MDP-S 0.2 | Water 1 |
| 22 (Invention) | KF6004 0.1 | Linalool 0.1 | PB822 1 | *4 3 | MDP-S 0.2 | Water 1 |
| 23 (Invention) | X-22-4272 0.1 | Linalool 0.1 | PB822 1 | *4 3 | MDP-S 0.2 | Water 1 |
| 24 (Invention) | X-22-6266 0.1 | Linalool 0.1 | PB822 1 | *4 3 | MDP-S 0.2 | Water 1 |
| 25 (Comparison) | BYK-302 0.2 | Linalool 0.1 | PB822 1 | *4 3 | MDP-S 0.2 | Water 1 |
| 26 (Invention) | X-22-4272 0.2 | Linalool 0.1 | PB822 1 | *4 3 | MDP-S 0.2 | Water 1 |
| 27 (Invention) | X-22-6266 0.2 | Linalool 0.1 | PB822 1 | *4 3 | MDP-S 0.2 | Water 1 |
| 28 (Comparison) | BYK-302 0.2 | Linalool 0.1 | PB822 1 | *4 3 | MDP-S 0.2 | Water 1 |
| 29 (Invention) | KF6004 0.2 | Linalool 0.1 | PB822 1 | *4 3 | MDP-S 0.2 | Water 1 |
| 30 (Comparison) | KF354L 0.2 | Linalool 0.1 | PB822 1 | *4 3 | MDP-S 0.2 | Water 1 |
| 31 (Comparison) | KF351 0.2 | Linalool 0.1 | PB822 1 | *4 3 | MDP-S 0.2 | Water 1 |
| 32 (Invention) | X-22-4272 0.2 | Linalool 0.1 | PB822 1 | *4 3 | MDP-S 0.2 | Water 1 |
| 33 (Comparison) | BYK-302 1 | Linalool 0.1 | PB822 1 | *4 3 | MDP-S 0.2 | Water 1 |
| 34 (Invention) | KF6004 1 | Linalool 0.1 | PB822 1 | *4 3 | MDP-S 0.2 | Water 1 |
| 35 (Invention) | X-22-4272 1 | Linalool 0.1 | PB822 1 | *4 3 | MDP-S 0.2 | Water 1 |
| 36 (Invention) | X-22-6266 1 | Linalool 0.1 | PB822 1 | *4 3 | MDP-S 0.2 | Water 1 |

*1: Compound name,
*2: Added amount (%),
*3: PF6 salt of Formula (40)
*4: Each color pigment Among the compounds described in the Table, *1, OXT221, OXT101, 2021P, Vf7010, UV16992, TIPA, TBA and a silicone surfactant are identical with those explained in Table 1, and each pigment is the following. Herein, a pigment concentration of light colors (Lk, Lm, Ly) was set to ⅕.

K: C. I. Pigment Black 7
C: C. I. Pigment Blue 15:3
M: C. I. Pigment Red 57:1
Y: C. I. Pigment Yellow 13
MDP-S: Sumilizer MDP-S [2,2'-methylenebis(4-methyl-6-t-butylphenol), produced by Sumitomo Chemical Co., Ltd.]

<Image Formation by Ink-Jet>

On an ink-jet recording apparatus having a constitution described in FIG. 1, which is equipped with a piezo type ink-jet nozzle (made of metal), each ink set prepared above was mounted and the following image recording was continuously performed on each long length recording medium having a width of 600 mm and a length of 20 m.

Ink supply system is constituted of an ink tank, a supply tube, a pre-room ink tank, a piping with a filter and a piezo head, and a portion from the pre-room tank to the head was heat-insulated and heated at 50° C. Herein, the head portion was heated corresponding to a viscosity of each actinic ray curable ink-jet ink and driven so as to eject multi-size dot of a liquid drop quantity of 2-15 pl at a resolution of 720×720 dpi, whereby the above-described ink-jet ink was continuously ejected. Further, a recording medium was heated at 40° C. by a plane heater. Ink-jet ink, after landing, was irradiated with a light quantity of 180 mW/cm$^2$ and cured in a moment (less than 0.5 seconds after landing), by use of hot cathode tubes (specially ordered product produced by Nippo Co., Ltd.) on the both sides of a carriage. The total ink layer thickness measured after image recording was in a range of 2-60 μm.

Formation of an ink-jet image was performed by printing according to the above-described method under environment of 25° C.-20% RH and 30° C.-80% RH. Herein, illuminance of each irradiation light source was measured by use of UVPF-A1 produced by Iwasaki Electric Co., Ltd. as accumulated illuminance. Further, the details of the abbreviations of recording mediums in the Table are as follows.

Yupo FGS: Synthetic Paper produced by Yupo Corporation
PVA: Polyvinyl Chloride (Evaluation of Image)

With respect to each image formed by the image forming method described above, following each evaluation was conducted.

<Stains>

A non-image area of printed image after 10 minutes of ejection period was observed while being magnified with a loupe to determine whether dirt of ink is present, whereby evaluation of dirt was carried out based on criteria same as evaluation criteria in Example 1.

A: No stain was recognized.
B: Slight stain was recognized, however, it was not a problematic level in practical use.
C: Some stain, which was a problematic level in practical use, was partly recognized.

D: Stain was recognized in almost all the surface, and it was a problematic level.

<Abrasion Resistance>

Each ink set was ejected on synthetic paper (synthetic paper Yupo FGS: described before), and abrasion resistance was evaluated with respect to a cured image based on ranking similar to Example 1.

5: No scratch was observed even with strong scrub.

4: Some scratches were observed with strong scrub, however, it was at the highest level to be usable in practice.

3: Some scratches were observed with strong scrub, however, it was at the lowest level to be usable in practice.

2: Some scratches were observed with strong scrub, and it was unallowable in practice.

1: Some scratches were observed even with weak scrub.

<Ejection Behavior>

Whether an ejection lack of a head nozzle was present after 10 minutes elapse of ejection or not, was visually observed and ejection behavior was evaluated based on the following criteria.

A: No nozzle clogging was observed.
B: 1-2 of nozzle clogging were observed.
C: Nozzle clogging of approximately a half of a nozzle number was observed.

The results are shown in Table 5.

TABLE 5

| | 30° C. · 80% RH | | | | 25° C. · 20% RH | | | |
|---|---|---|---|---|---|---|---|---|
| | Yupo FGS | | | | | Yupo FGS | | |
| Sample No. | PVC Stain | Abrasion | Stain | *1 | PVC stain | Abrasion | Stain | *1 |
| 21 (Comparison) | D | 1 | C | C | D | 1 | C | C |
| 22 (Invention) | A | 5 | A | A | A | 5 | A | A |
| 23 (Invention) | A | 5 | A | A | A | 5 | A | A |
| 24 (Invention) | A | 5 | A | A | A | 5 | A | A |
| 25 (Comparison) | D | 1 | C | C | D | 1 | C | C |
| 26 (Invention) | A | 5 | A | A | A | 5 | A | A |
| 27 (Invention) | A | 5 | A | A | A | 5 | A | A |
| 28 (Comparison) | D | 1 | C | C | D | 1 | C | C |
| 29 (Invention) | A | 5 | A | A | B | 5 | A | B |
| 30 (Comparison) | D | 3 | D | C | D | 3 | D | C |
| 31 (Comparison) | D | 3 | D | C | D | 3 | D | C |
| 32 (Invention) | A | 5 | A | A | A | 5 | A | A |
| 33 (Comparison) | D | 2 | C | C | D | 2 | C | C |
| 34 (Invention) | B | 5 | A | B | B | 5 | A | B |
| 35 (Invention) | A | 5 | A | A | A | 5 | A | A |
| 36 (Invention) | A | 5 | A | A | A | 5 | A | A |

*1: Ejection behavior

It has been proved from Table 5 that samples of this invention exhibit excellent ejection behavior, no deterioration of an image due to stains, as well as excellent capability irrespective of different environment.

DESCRIPTION OF THE SYMBOLS

1: Ink-jet recording apparatus
2: Head carriage
3: Ink-jet recording head
31: Ink ejection outlet
4: Irradiation means
5: Platen portion
6: Guide member
7: Bellows structure
8: Recording medium

What is claimed is:

1. An image forming method comprising the steps of:
1) ejecting an actinic ray curable ink-jet ink from a metal nozzle installed in an ink-jet recording head onto a recording medium, the actinic ray curable ink-jet ink comprising an actinic ray curable composition comprising a photo-polymerizable compound, a photo-polymerization initiator, and a silicone surfactant, wherein the terminal positions of the silicone surfactant are modified with a polyether and the photo-polymerizable compound is a cationic polymerizable compound, and
2) irradiating actinic rays to the ejected actinic ray curable ink-jet ink on the recording medium,
wherein the actinic ray curable ink-jet ink comprises at least one kind of pigment, and
wherein a maximum particle size of the at least one kind of pigment ranges from 0.3 μm to 10 μm.

2. The image forming method of claim 1, wherein an HLB value of the silicone surfactant is 9-30, and an amount of the terminal polyether-modified silicone surfactant is 0.001-10 weight % based on a total weight of the actinic ray curable composition.

3. The image forming method of claim 1, further comprising transferring the recording medium on or above a platen portion, the platen portion having a function to absorb ultraviolet rays.

4. The image forming method of claim 1, wherein an HLB value of silicone surfactant is 9-30.

5. The image forming method of claim 4, wherein the HLB value of the silicone surfactant is 12-25.

6. The image forming method of claim 1, wherein the cationic polymerizable compound comprises a compound having an oxetane ring or an epoxy compound.

7. The image forming method of claim 1, wherein an amount of the silicone surfactant is 0.001-10 weight % based on a total weight of the actinic ray curable composition.

8. The image forming method of claim 1, wherein a maximum particle size of the pigment is 0.3-3 μm.

9. The image forming method of claim 1, wherein the actinic ray curable ink-jet ink further comprises a pigment dispersant having a basic anchor portion.

10. The image forming method of claim 1, wherein the actinic ray curable ink-jet ink further comprises a basic compound of 10-1,000 weight ppm of the total photo-polymerizable compound.

11. The image forming method of claim 1, wherein irradiating actinic rays to the ejected actinic ray curable ink-jet ink is carried out during 0.001-1.0 second after landing of the actinic ray curable ink-jet ink on the recording medium.

12. The image forming method of claim 1, wherein a minimum amount of ink droplets, which is ejected from a nozzle of the ink-jet recording head, is 2-15 pl.

13. The image forming method of claim 1, wherein actinic ray curable ink-jet ink is ejected from the recording head after the actinic ray curable ink and the recording head are heated to 35-100° C.

14. The image forming method of claim 1, wherein the actinic ray curable ink is ejected onto a recording medium which is heated to 35-60° C.

* * * * *